(12) United States Patent
Iida

(10) Patent No.: US 7,220,198 B2
(45) Date of Patent: May 22, 2007

(54) ELECTRIC ACTUATOR

(75) Inventor: Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 352 days.

(21) Appl. No.: 10/678,101

(22) Filed: Oct. 6, 2003

(65) Prior Publication Data

US 2004/0065162 A1 Apr. 8, 2004

(30) Foreign Application Priority Data

Oct. 8, 2002  (JP)  ............... 2002-294891
Apr. 15, 2003 (JP)  ............... 2003-110619

(51) Int. Cl.
*F16G 7/06* (2006.01)

(52) U.S. Cl. .................................... 474/253

(58) Field of Classification Search ............... 474/253, 474/255, 257, 101, 103, 109; 358/474, 497; 400/352, 354; 347/37–39

See application file for complete search history.

(56) References Cited

U.S. PATENT DOCUMENTS

| | | | |
|---|---|---|---|
| 4,537,084 A |   | 8/1985  | Passemard et al. |
| 5,419,744 A | * | 5/1995  | Kagebeck ................... 474/253 |
| 5,902,201 A | * | 5/1999  | Vermeer et al. ............ 474/109 |
| 5,988,927 A | * | 11/1999 | Pfarr ............................ 403/2 |
| 6,223,611 B1 |   | 5/2001  | Kelley |
| 6,860,828 B2 | * | 3/2005  | Huang ........................ 474/101 |
| 2003/0076380 A1 | * | 4/2003 | Yusef et al. .................. 347/37 |
| 2005/0096165 A1 | * | 5/2005 | Lin ............................. 474/101 |

FOREIGN PATENT DOCUMENTS

| | | | |
|---|---|---|---|
| DE | 3739272 A1 | * | 6/1989 |
| JP | 52-73270 |  | 6/1977 |
| JP | 58-57556 |  | 4/1983 |
| JP | 60-150355 |  | 10/1985 |
| JP | 63-134191 |  | 6/1988 |
| JP | 06-328377 |  | 11/1994 |
| JP | 09-089067 |  | 3/1997 |
| JP | 09234926 A | * | 9/1997 |
| JP | 10-325451 |  | 12/1998 |
| JP | 11254775 A | * | 9/1999 |
| JP | 2001071577 A | * | 3/2001 |
| JP | 2001-321409 |  | 11/2001 |

* cited by examiner

*Primary Examiner*—Vicky A. Johnson
(74) *Attorney, Agent, or Firm*—Paul A. Guss

(57) ABSTRACT

An electric actuator comprises a rotary driving source, a timing belt which is circled or orbited under the driving action of the rotary driving source, a slider which is displaced by the timing belt in the axial direction, and a belt-adjusting mechanism which is connected to a side surface of the slider. Both ends of the timing belt are connected to the belt-adjusting mechanism respectively. The tension of the timing belt is adjusted by rotating an adjusting screw of the belt-adjusting mechanism.

23 Claims, 26 Drawing Sheets

ELECTRIC ACTUATOR

BACKGROUND OF THE INVENTION

1. Field of the Invention

The present invention relates to an electric actuator comprising a driving force-transmitting belt for transmitting the rotary driving force of a rotary driving source to a slider so that the slider is moved.

2. Description of the Related Art

An electric actuator has been hitherto widely used as a means for transporting a workpiece or the like, in which a timing belt is driven by the rotary driving force of a rotary driving source such as a motor to displace a slider for transporting the workpiece.

A tension-adjusting means is provided for the timing belt of a resin material in order to adjust the tension when the timing belt is loosened during the assembling or due to the use for many years.

As the tension-adjusting means for the timing belt, for example, a pair of pulleys are used. The timing belt runs over the pulleys. The pulleys are displaced in directions to approach or separate from each other so that the tension of the timing belt is adjusted.

Further, for example, a pair of connecting members, which are connected to both ends of the timing belt, are installed to a slider. The tension of the timing belt is adjusted by making the pair of connecting members approach or separate from one another.

As shown in FIG. 25, a conventional electric actuator 1 comprises a guide rail 3 which is provided along the axis of a rectangular housing 2, and a slide block 4 which transports the workpiece by sliding along the guide rail 3.

In the housing 2, there are a driving pulley 5a which is rotated by an unillustrated rotary driving source, and a plurality of driven pulleys 5b which are arranged in the four corners of the housing 2. The driving pulley 5a is rotated by the unillustrated rotary driving source, and a timing belt 6 running over the driving pulley 5a and the driven pulleys 5b is circled or orbited by a predetermined distance. Both ends of the timing belt 6 are connected to belt attachment fixtures 7a, 7b. The belt attachment fixtures 7a, 7b are installed to the upper surface of the slide block 4 by attachment screws 8. The belt attachment fixtures 7a, 7b and the timing belt 6 are integrally connected to one another by screw members 9.

Elongate holes 11a, 11b extend in the axial direction through fastening sections 10a, 10b which are provided at upper portions of the belt attachment fixtures 7a, 7b.

A groove 12 is formed on the upper surface of the slide block 4, and the belt attachment fixtures 7a, 7b are slidably engaged with the groove 12 in the axial direction. The groove 12 is recessed by a predetermined depth on the upper surface of the slide block 4.

When the tension is applied to the timing belt 6, the attachment screws 8 to fix the belt attachment fixtures 7a, 7b to the slide block 4 are loosened, and one belt attachment fixture 7a is displaced in the direction to approach the other belt attachment fixture 7b along the groove 12 of the slide block 4. In this case, the belt attachment fixture 7a, 7b is displaced in the groove 12 along the shape of the elongate hole 11a, because the attachment screws 8 are engaged with the elongate hole 11a which extends in the axial direction.

As a result, the ends of the timing belt 6 are pulled in the directions to approach one another. Therefore, the tension of the timing belt 6 is increased. When the attachment screws 8, which are temporarily tacked to the slide block 4, are tightened to completely fix the belt attachment fixtures 7a, 7b, the adjusted tension of the timing belt 6 is retained (see, for example, Japanese Laid-Open Patent Publication No. 9-89067).

In the case of the conventional electric actuator 1 shown in FIG. 25, if the driving pulley 5a or the driven pulley 5b, over which the timing belt 6 runs, is displaced to adjust the tension of the timing belt 6, it is necessary to secure the space for displacing the driving pulley 5a or the driven pulley 5b in the axial direction. Therefore, the size or dimension of the electric actuator 1 in the axial direction is increased, and the entire electric actuator 1 is large.

In relation to the method in which the tension of the timing belt 6 is adjusted by displacing the belt attachment fixtures 7a, 7b in the axial direction, the attachment positions of the fastening sections 10a, 10b of the belt attachment fixtures 7a, 7b to be attached to the slide block 4 are offset with respect to the attachment positions of the timing belt 6 in the X-Y plane as viewed in the direction of the arrow Z. Therefore, the moments are caused by the tension of the timing belt 6, and are exerted on the belt attachment fixtures 7a, 7b in the directions (directions of the arrows Q) to pull both ends of the timing belt 6 through the fastening sections 10a, 10b. As a result, it is difficult to correctly adjust the tension of the timing belt 6.

Another method is explained in FIG. 26, for example. In this case, end blocks 13a, 13b are arranged at both ends of an operation mechanism 19. A timing belt 16, which transmits the rotary driving force supplied from a driving mechanism 14 to an operating section 15, has its ends 16a, 16b which are fixed to the end blocks 13a, 13b by fixing pieces 17a, 17b, respectively.

The ends 16a, 16b of the timing belt 16 are inserted into attachment portions of the end blocks 13a, 13b while the fixing pieces 17a, 17b are engaged with teeth of the timing belt 16. When two screw members 18a, 18b, which are screwed with each of the fixing pieces 17a, 17b, are tightened, the ends 16a, 16b of the timing belt 16 are integrally fixed to the end blocks 13a, 13b (see, for example, Japanese Laid-Open Patent Publication No. 63-134191).

In the conventional operation mechanism 19 shown in FIG. 26, the ends 16a, 16b of the timing belt 16 are fixed to the end blocks 13a, 13b by screwing the two screw members 18a, 18b into each of the fixing pieces 17a, 17b and pressing the fixing pieces 17a, 17b toward the timing belt 16.

Therefore, when attachment operation is performed for the timing belt 16, the operation is complicated to fix the timing belt 16 with the fixing pieces 17a, 17b by screwing the plurality of screw members 18a, 18b. Further, the number of parts is increased, such as the plurality of fixing screw members 18a, 18b.

When the timing belt 16 is fixed by tightening the screw members 18a, 18b, the tightening force may be changed depending on the respective operators, and the screw members 18a, 18b may be excessively tightened. Therefore, excessive pressing force may be exerted on the timing belt 16 by the fixing pieces 17a, 17b, and the durability of the timing belt 16 may be deteriorated.

On the other hand, if the tightening force is changed depending on the respective operators, and the tightening force to tighten the screw members 18a, 18b is decreased, then the timing belt 16 may be loosened. As a result, the attachment of the timing belt 16 by the fixing pieces 17a, 17b is unstable due to the difference of the tightening force depending on the respective operators.

SUMMARY OF THE INVENTION

A general object of the present invention is to provide an electric actuator provided with a tension-adjusting mechanism which makes it possible to easily and correctly adjust the tension of a driving force-transmitting belt for transmitting the rotary driving force to a slider.

A principal object of the present invention is to provide an electric actuator provided with a tension-adjusting mechanism which makes it possible to easily and reliably fix a driving force-transmitting belt and which makes it possible to decrease the cost by reducing the number of parts.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
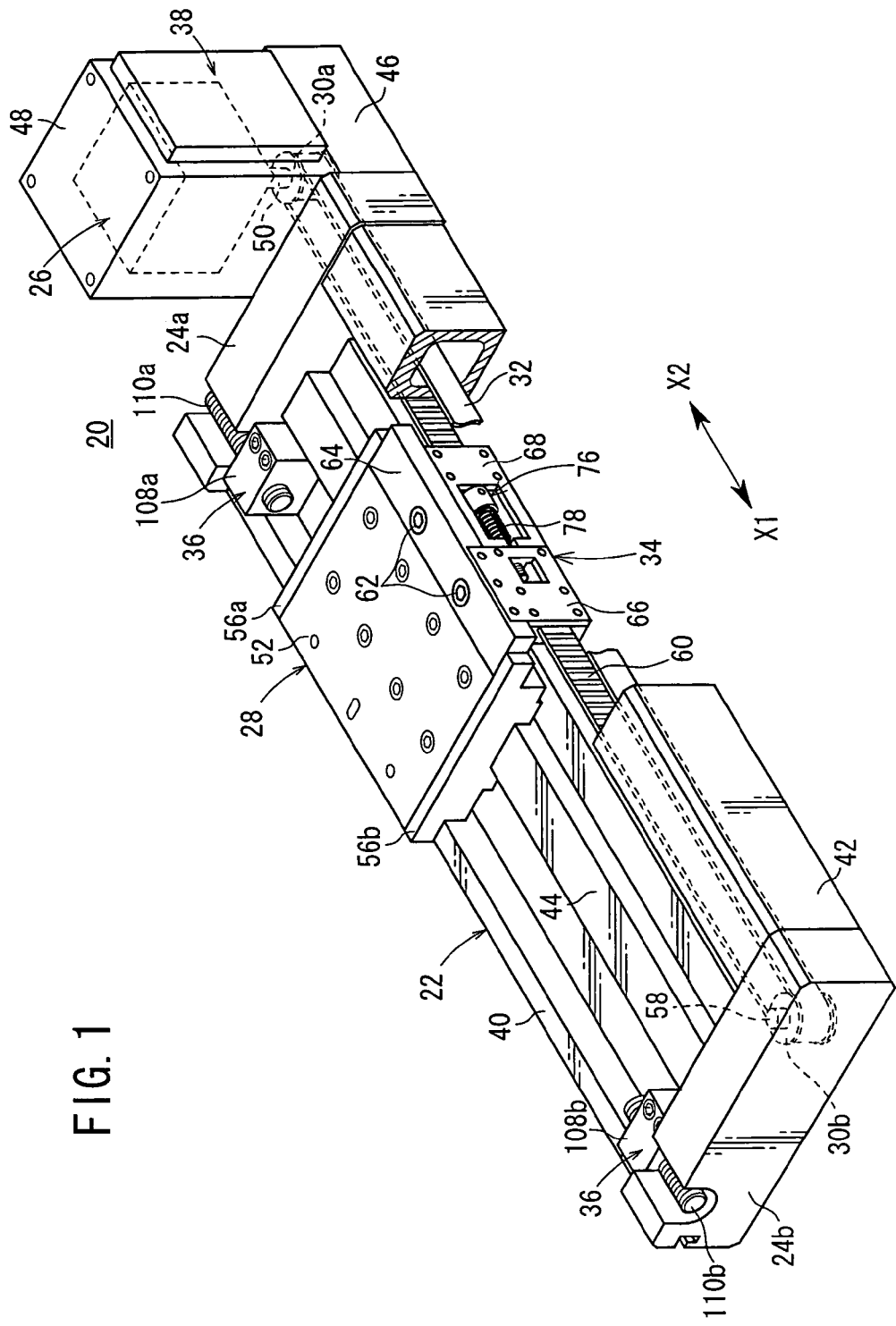
FIG. 1 is a perspective view illustrating an electric actuator according to a first embodiment of the present invention.

With reference to FIG. 1, reference numeral 20 indicates an electric actuator according to a first embodiment of the present invention.

The electric actuator 20 comprises an elongate body 22, end blocks 24a, 24b which are integrally connected to both ends of the body 22, a rotary driving source 26 connected to one end block 24a and driven by an electric signal, a slider 28 for transporting a workpiece, and a timing belt (driving force-transmitting belt) 32 which transmits the driving force to the slider 28 via a gear section 30a fitted into the rotary driving source 26.

The electric actuator 20 further comprises a belt-adjusting mechanism (tension-adjusting mechanism) 34 which adjusts the tension of the timing belt 32, stopper mechanisms 36 which regulate the displacement amount of the slider 28, and a control panel 38 which is used to control the electric actuator 20.

The body 22 includes a main frame 40 which is arranged in the axial direction, a hollow subframe 42 which is provided substantially in parallel to the main frame 40 and through which the timing belt 32 is inserted, and a guide rail 44 which is arranged in the axial direction at a substantially central portion of the body 22 and which guides the slider 28 in the axial direction. The end blocks 24a, 24b are connected to the both ends of the main frame 40 and the subframe 42, respectively.

The rotary driving source 26 comprises, for example, a stepping motor. The rotary driving source 26 is installed to the upper surface of a bracket 46 which is connected to the end block 24a. The rotary driving source 26 is surrounded by a casing 48. The casing 48 is detachably attached to the bracket 46 by unillustrated bolts or the like. A drive shaft 50 protrudes under the rotary driving source 26, and is integrally fitted into the gear section 30*a*.

The slider 28 includes a table 52 on which the workpiece or the like is placed, an adapter 54 (see FIG. 2) which is installed to the side surface of the table 52 and to which the belt-adjusting mechanism 34 is connected, and end surface plates 56*a*, 56*b* which prevent the end surfaces of the table 52 from abrasion upon abutment against stopper bolts 110*a*, 110*b* of the stopper mechanism 36, respectively, as described later on. The slider 28 is provided slidably along the guide rail 44 which is arranged substantially in parallel to the main frame 40 and the subframe 42 of the body 22.

The timing belt 32 runs over the gear section 30*a* into which the drive shaft 50 of the rotary driving source 26 is fitted and the gear section 30*b* which is rotatably supported by a shaft 58 in the end block 24*b*. A plurality of parallel teeth 60 are formed on the inner circumferential surface of the timing belt 32, and are spaced from each other by predetermined distances. The parallel teeth 60 are meshed with the gear sections 30*a*, 30*b*, and thus the timing belt 32 is circled or orbited.

Figure 2:
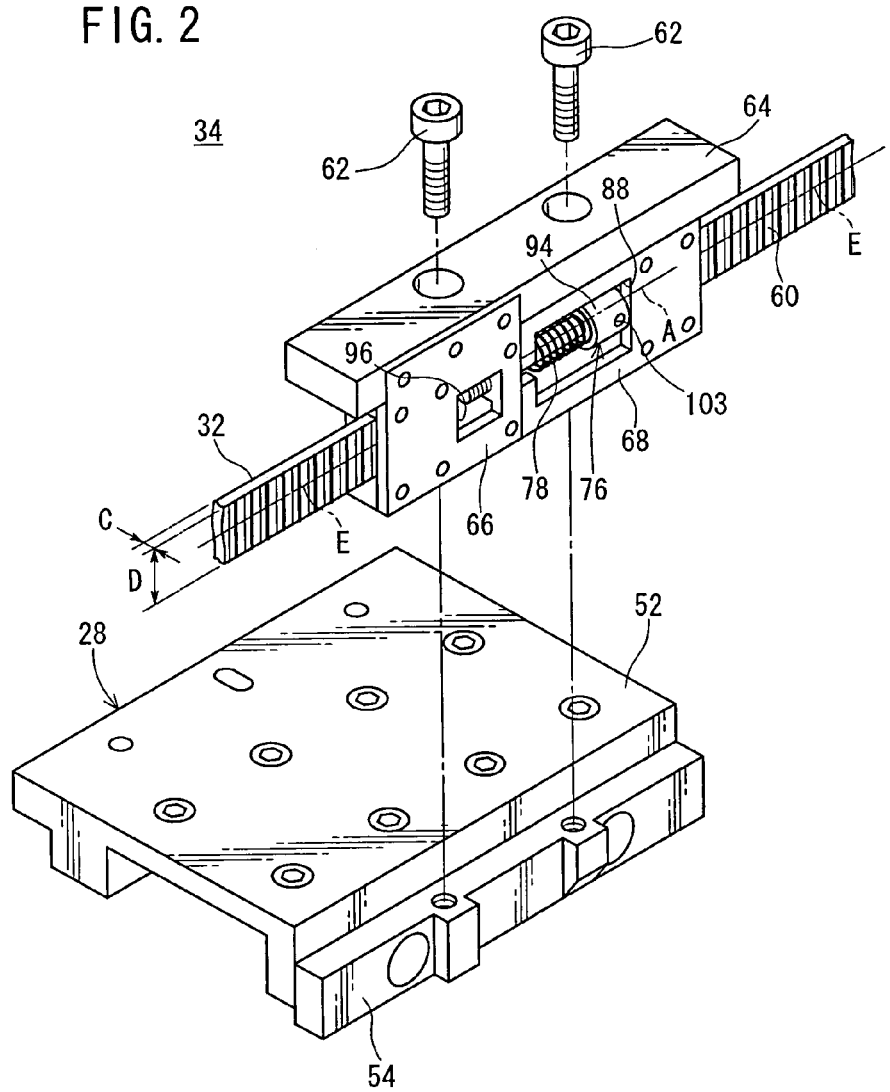
FIG. 2 is a perspective view illustrating an assembling state of a belt-adjusting mechanism with respect to a slider shown in FIG. 1.
Figure 3:
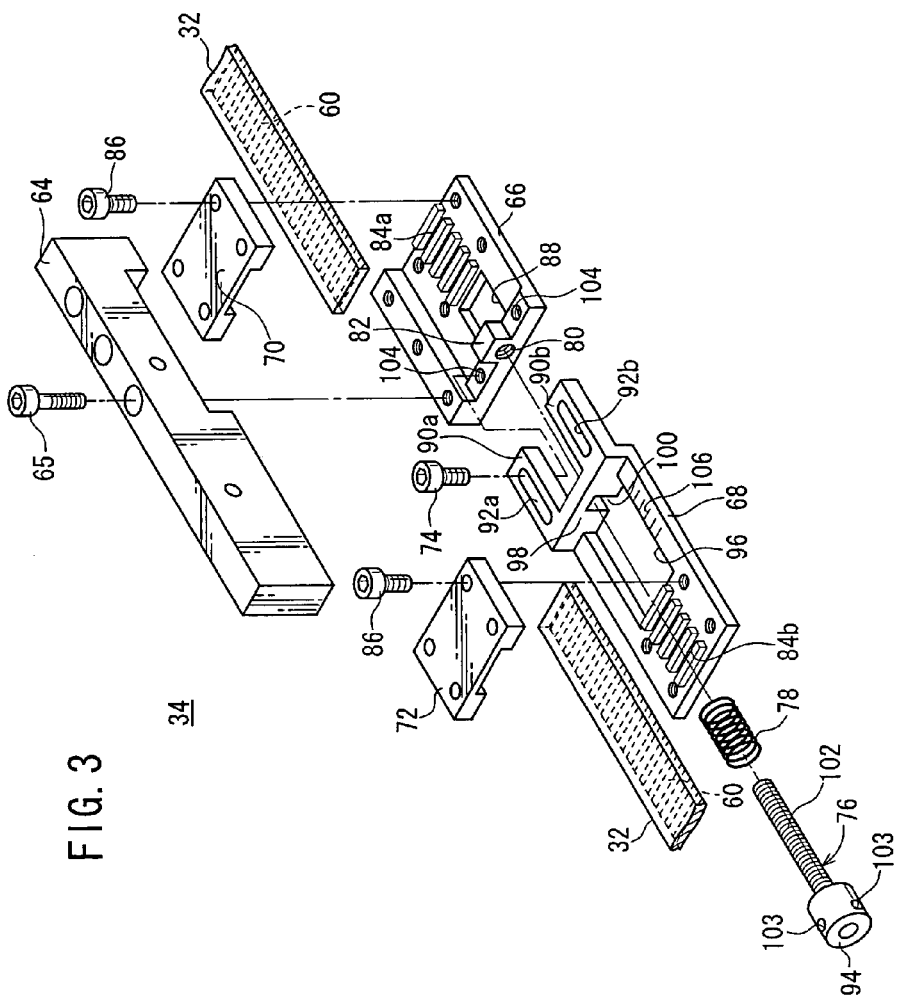
FIG. 3 is an exploded perspective view illustrating the belt-adjusting mechanism shown in FIG. 2.

As shown in FIG. 3, the belt-adjusting mechanism 34 includes an attachment member 64 which is connected to the upper surface of the adapter 54 (see FIG. 2) by attachment bolts 62, a first member 66 which is connected substantially perpendicularly to the attachment member 64 by connecting bolts 65, a second member 68 which is provided displaceably in the axial direction with respect to the first member 66, a first fixture (first fixing member) 70 which connects one end of the timing belt 32 to the first member 66, and a second fixture (second fixing member) 72 which connects the other end of the timing belt 32 to the second member 68.

The belt-adjusting mechanism 34 is provided with lock screws 74 which engage or fix the second member 68 with respect to the first member 66, an adjusting screw (adjusting member) 76 which is screwed with a substantially central portion of the first member 66 and which adjusts the distance between the first member 66 and the second member 68 based on the screwing amount, and a coil spring (elastic member) 78 which is inserted into the adjusting screw 76 and which urges the second member 68 to approach the first member 66.

A screw section 82 having a screw hole 80 is formed at the substantially central portion of the first member 66 on the side facing the second member 68. A screw section 102 of the adjusting screw 76 is screwed with the screw section 82 displaceably in the axial direction (see FIG. 4).

Engaging grooves 84*a* are formed at a portion of the first member 66 to which the first fixture 70 is installed for the parallel teeth 60 of the timing belt 32. The parallel teeth 60 of the timing belt 32 are installed so that the parallel teeth 60 are meshed with the engaging grooves 84*a*, on which the first fixture 70 is attached by fixing screws 86. As a result, the timing belt 32 is interposed between the first member 66 and the first fixture 70, and the timing belt 32 is engaged with the engaging grooves 84*a*. Thus, the timing belt 32 is prevented from disengagement in the axial direction.

A first rectangular hole 88 having a predetermined length in the axial direction is formed between the screw section 82 and the portion to which the first fixture 70 is installed. The screw section 102 of the adjusting screw 76 screwed with the screw-engaging section 82 is displaceably arranged in the first rectangular hole 88 (see FIGS. 5 and 6).

On the other hand, the second member 68 has two branches 90*a*, 90*b* each of which protrudes by a predetermined length in the direction toward the first member 66. Engaging holes 92*a*, 92*b*, which have substantially identical shapes, are formed in a form of elongate hole in the axial direction through the two branches 90*a*, 90*b*.

Engaging grooves 84*b* for the parallel teeth 60 of the timing belt 32 are formed at a portion of the second member 68 to which the second fixture 72 is installed. The parallel teeth 60 of the timing belt 32 are installed so that the parallel teeth 60 are engaged with the engaging grooves 84*b*, on which the second fixture 72 is attached by fixing screws 86.

As a result, the timing belt 32 is interposed between the second member 68 and the second fixture 72, and the timing belt 32 is engaged with the engaging grooves 84*b*. Thus, the timing belt 32 is prevented from disengagement in the axial direction.

Figure 4:
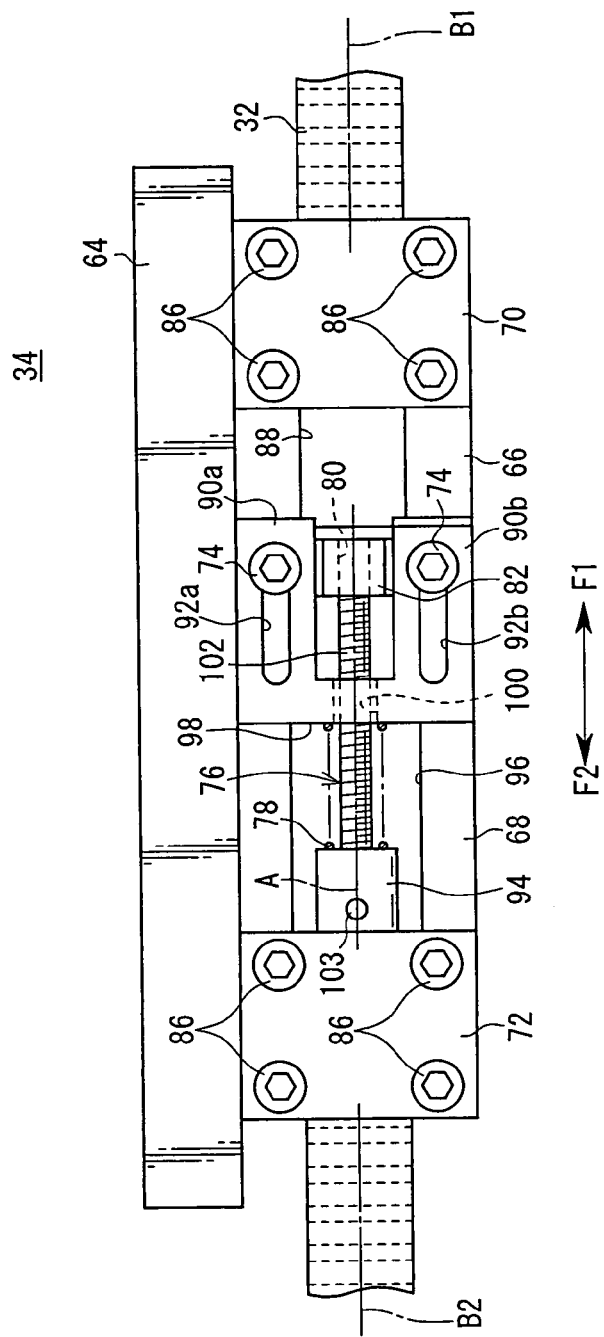
FIG. 4 is a front view illustrating a state in which lock screws of the belt-adjusting mechanism shown in FIG. 2 are loosened so that a second member is displaceable.
Figure 5:
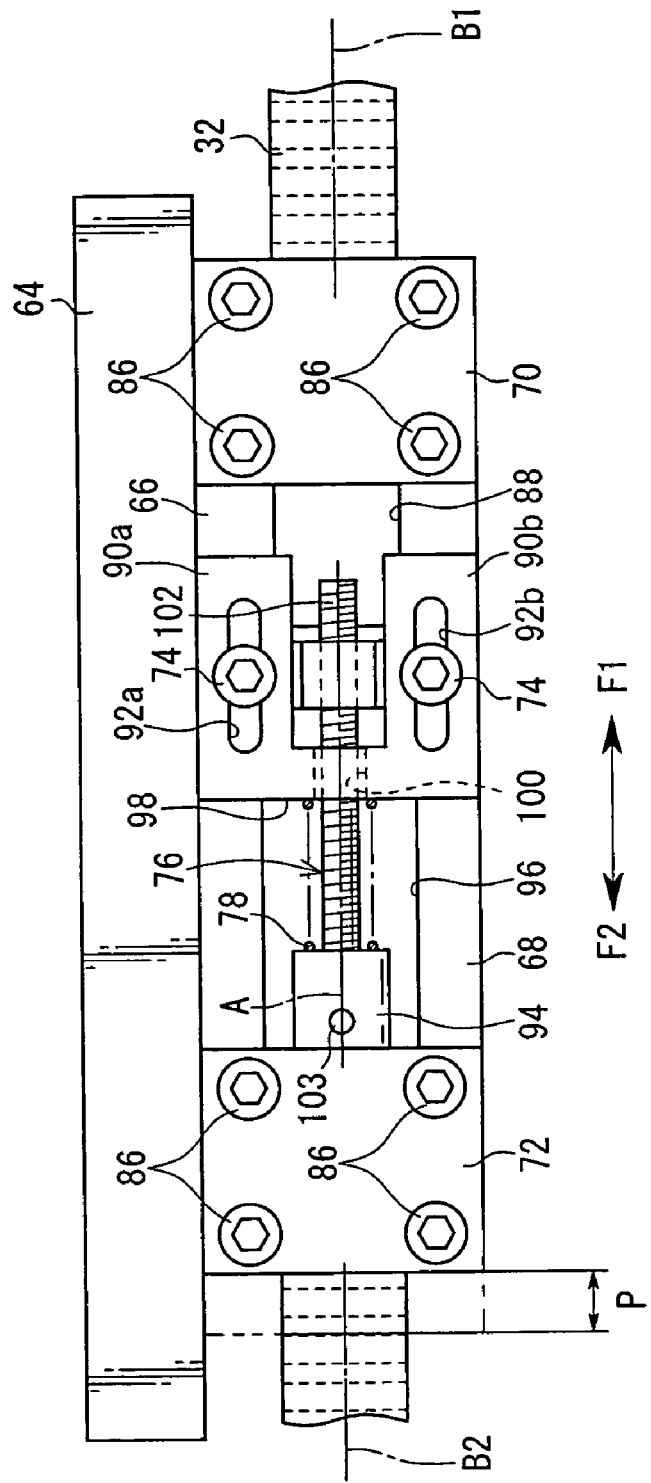
FIG. 5 is a front view illustrating an intermediate position in which an adjusting screw of the belt-adjusting mechanism shown in FIG. 2 is rotated to adjust the tension of a timing belt, and the second member is fixed by the lock screws.
Figure 6:
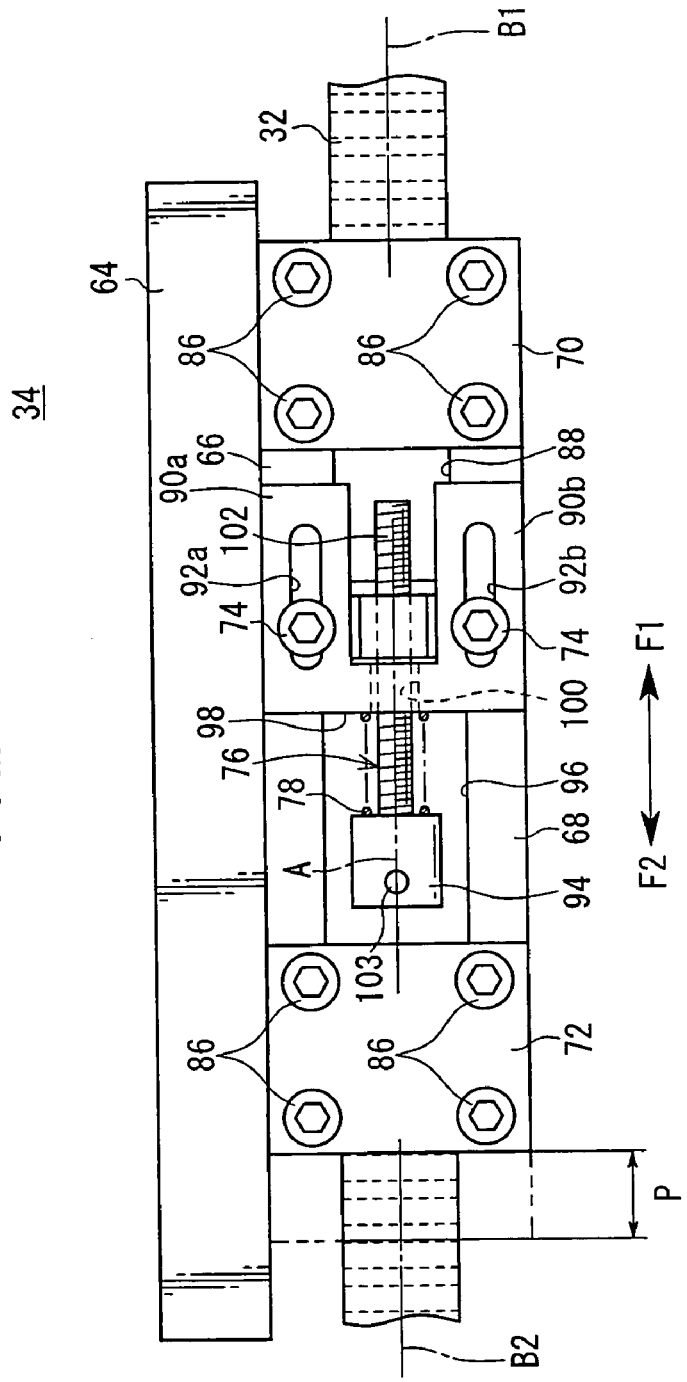
FIG. 6 is a front view illustrating a state in which the adjusting screw of the belt-adjusting mechanism shown in FIG. 2 is rotated to press a spring, and the second member is displaced.

As shown in FIGS. 4 and 5, the axis A of the coil spring 78 and the adjusting screw 76 screwed with the screw section 82, the center line B1 of one end of the timing belt 32 installed to the first member 66, and the center line B2 of the other end of the timing belt 32 installed to the second member 68 are provided substantially on an identical straight line within a range of cross section of the timing belt 32. As shown in FIG. 2, the axis A of the adjusting screw 76 and the coil spring 78, and the center line E running through the center of the thickness C and also the center of the width D of the timing belt 32 are preferably arranged on an identical straight line.

As shown in FIG. 3, a second rectangular hole 96 having a predetermined length in the axial direction is formed between the two branches 90*a*, 90*b* of the second member 68 and the portion to which the second fixture 72 is installed. The second rectangular hole 96 is arranged so that a columnar head section 94 of the adjusting screw 76 and the coil spring 78 face the second rectangular hole 96 (see FIG. 4).

A cutout groove 100 formed by cutting out a wall surface 98 is disposed perpendicularly to the two branches 90*a*, 90*b* at a position facing the screw section 82 of the first member 66. The screw section 102 of the adjusting screw 76 is inserted into the cutout groove 100. The coil spring 78 is inserted into the screw section 102 so that the coil spring 78 abuts against the wall surface 98 and the lower surface of the head section 94. The coil spring 78 urges the head section 94 of the adjusting screw 76 to separate from the first member 66 by the spring force thereof.

A plurality of insertion holes 103 circumferentially separated from each other by predetermined angles are formed on the outer circumferential surface of the head section 94. The adjusting screw 76 screwed with the screw section 82 of the first member 66 can be rotated more conveniently by inserting an unillustrated shaft or the like into the insertion hole 103 to rotate the head section 94 by the shaft.

A pair of lock screw holes 104 are formed on both sides of the screw section 82 of the first member 66. The lock screws 74 are screwed with the lock screw holes 104 from upper positions through the engaging holes 92*a*, 92*b* of the second member 68.

A scale (or graduations, indication means or indication mechanism) 106 is defined at predetermined distances in the axial direction on the side of the second rectangular hole 96. The scale 106 can be used to confirm the position of the head section 94 of the adjusting screw 76 and confirm the adjusting amount of the tension of the timing belt 32.

The stopper mechanism 36 includes stoppers 108*a*, 108*b* which are installed to upper portions of the end blocks 24*a*, 24*b*, and stopper bolts 110*a*, 110*b* which are screwed with the stoppers 108*a*, 108*b* and which adjust relative stop positions as the start point and the end point of the slider 28.

The control panel 38 is detachably installed to the side surface of the casing 48 by unillustrated bolts or the like.

The electric actuator 20 according to the first embodiment of the present invention is basically constructed as described above. Next, its operation, function, and effect will be explained.

Firstly, an explanation will be made about a method for adjusting the tension of the timing belt 32 by the belt-adjusting mechanism 34, in which the both ends of the timing belt are fixed to the belt-adjusting mechanism 34.

The lock screws 74, which have been tightened to the lock screw holes 104 of the first member 66, are loosened so that the second member 68, which has been fixed by the lock screws 74, is displaceable in the axial direction with respect to the first member 66. In this procedure, the adjusting screw 76 is loosened until the first member 66 and the second member 68 are separated most from each other (see FIG. 4).

In this situation, the lock screws 74 are screwed with the lock screw holes 104 of the first member 66 (see FIG. 3). Therefore, the second member 68, which is engaged with the lock screws 74 through the engaging holes 92, is prevented from disengagement from the first member 66.

Subsequently, the adjusting screw 76 is screwed so that the head section 94 is displaced in the direction (direction of the arrow F1) toward the first member 66 against the spring force of the coil spring 78. Accordingly, the second member 68 is displaced in the direction (direction of the arrow F1) toward the first member 66 (see FIG. 5). During this process, the second member 68, which is engaged by the lock screws 74 through the engaging holes 92a, 92b, is displaced in the axial direction along the engaging holes 92a, 92b.

As a result, as shown in FIG. 5, the timing belt 32, which is integrally connected to the second member 68, has the other end which is integrally pulled in the direction (direction of the arrow F1) toward the first member 66. Accordingly, an excessive amount of slack P of the timing belt 32 is removed. In this situation, the tension is not applied yet to the timing belt 32.

When the adjusting screw 76 is further rotated, then the coil spring 78 is pressed, and the spring force is generated thereby. The spring force is applied as the tension with respect to the timing belt 32.

Finally, the lock screws 74 are tightened to fix the second member 68 while the second member 68 is displaced to a position at which a desired tension of the timing belt 32 is obtained. As a result, the timing belt 32 is retained in a state in which the tension of the timing belt 32 is desirably adjusted (see FIG. 6).

An explanation will be made about operation, function, and effect of the electric actuator 20 for which the tension of the timing belt 32 has been adjusted as described above.

An electric signal (for example, a pulse signal) is supplied from an unillustrated power source to the rotary driving source 26. When the rotary driving source 26 is rotated based on the electric signal, the gear section 30a is rotated on one end of the body 22 by the drive shaft 50.

The gear section 30b, over which the timing belt 32 runs, is integrally rotated by the rotation of the gear section 30a. The slider 28, which is integrally connected to the timing belt 32, is displaced in the axial direction (in the direction of the arrow X1 in FIG. 1) along the guide rail 44 of the body 22. The end surface plate 56b of the slider 28 abuts against the stopper bolt 110b of the stopper 108 at the displacement terminal end.

When the polarity of the electric signal supplied from the unillustrated power source is reversed, then the rotary driving source 26 is rotated in the direction opposite to the above, and the slider 28, which is integrally connected to the timing belt 32, is displaced in the axial direction (in the direction of the arrow X2 in FIG. 1) along the guide rail 44 of the body 22. The end surface plate 56a of the slider 28 abuts against the stopper bolt 110a of the stopper 108a at the initial position.

Figure 25:
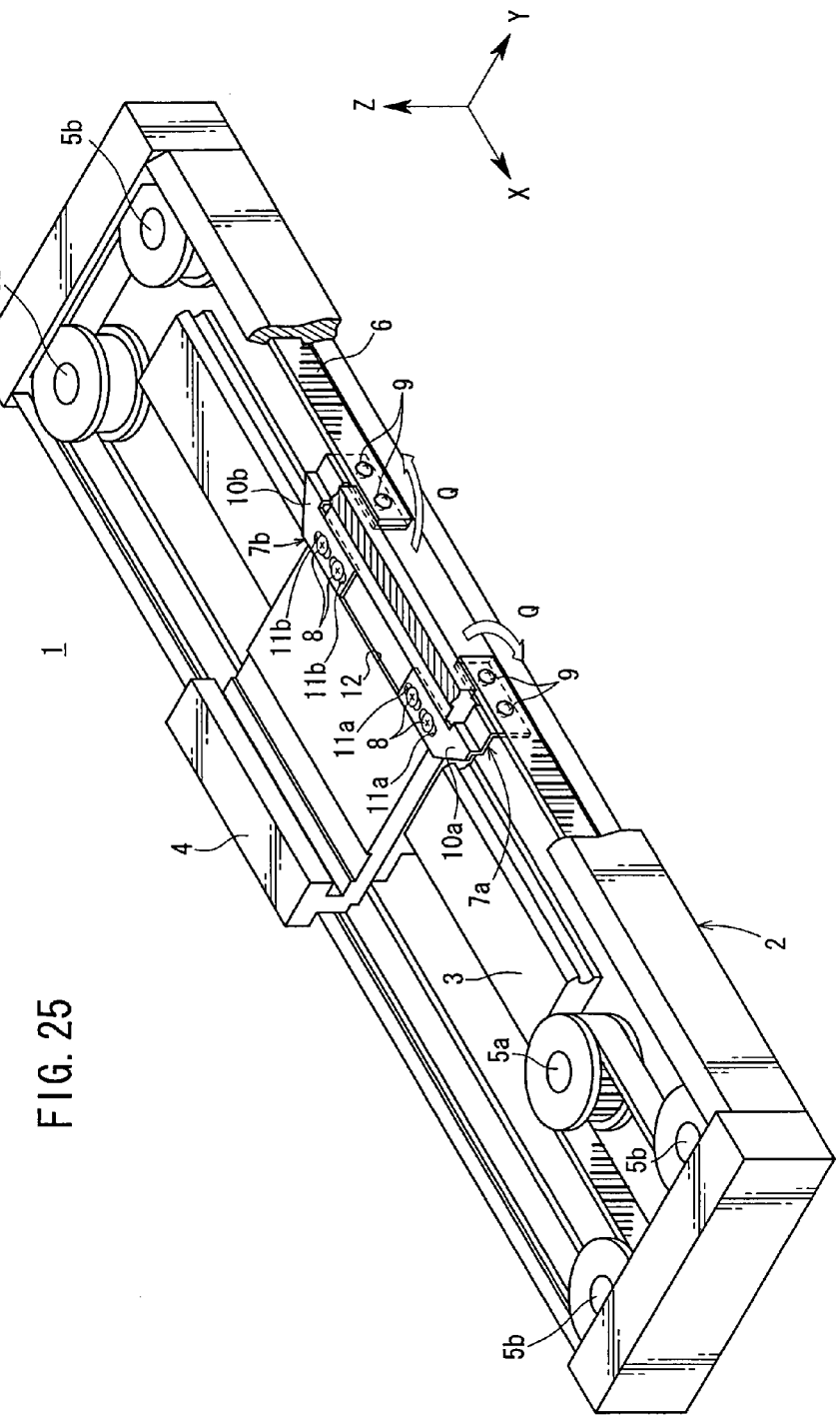
FIG. 25 is, with partial omission, a conventional electric actuator.
Figure 26:
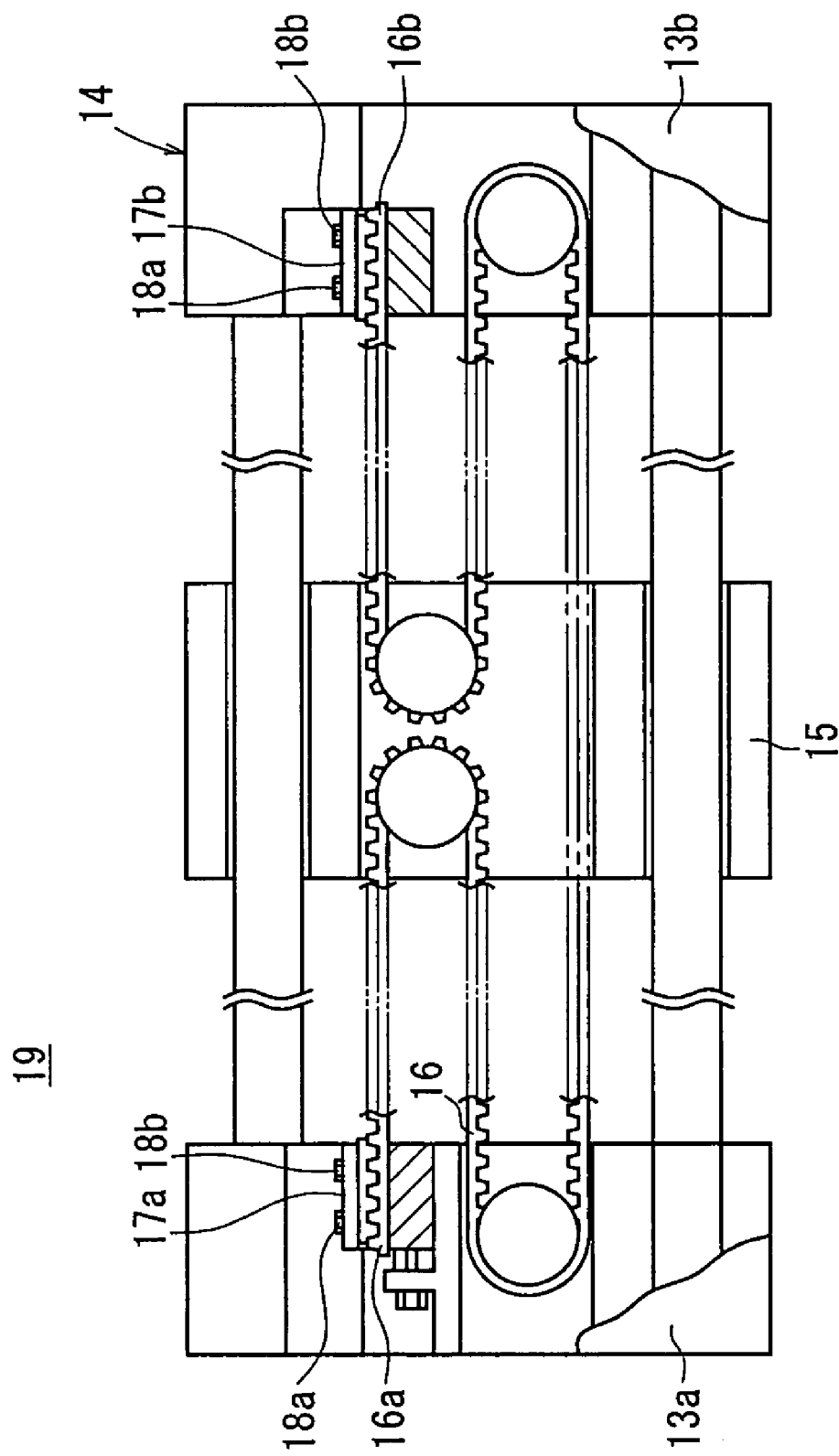
FIG. 26 is, with partial cutaway, a lateral sectional view illustrating another conventional electric actuator.

As described above, in the first embodiment, the axis A of the adjusting screw 76 and the coil spring 78 and the center lines B1, B2 of the ends of the timing belt 32 are provided on the substantially identical straight line within the cross section of the timing belt 32. Therefore, when the tension of the timing belt 32 is adjusted, the moment Q (see FIG. 25) can be avoided unlike the conventional technique.

Therefore, the displacement amount of the coil spring 78 pressed and deformed by the adjusting screw 76 can be converted by calculation into the tension of the timing belt 32. That is, tension of timing belt 32=spring constant of coil spring 78×displacement amount. As a result, the tension of the timing belt 32 can be correctly adjusted by using the adjusting screw 76.

The scale 106 is provided for the second member 68, and the position of the head section 94 when the adjusting screw 76 is rotated is confirmed by the scale 106. Accordingly, the amount of adjustment of the tension of the timing belt 32 can be easily confirmed without providing a separate tension meter or the like.

Next, an explanation will be made about a belt-adjusting mechanism 150 applied to an electric actuator according to a second embodiment. The constituent elements that are same as those of the belt-adjusting mechanism 34 shown in FIGS. 2 to 6 are designated by the same reference numerals, and detailed explanation thereof will be omitted.

Figure 7:
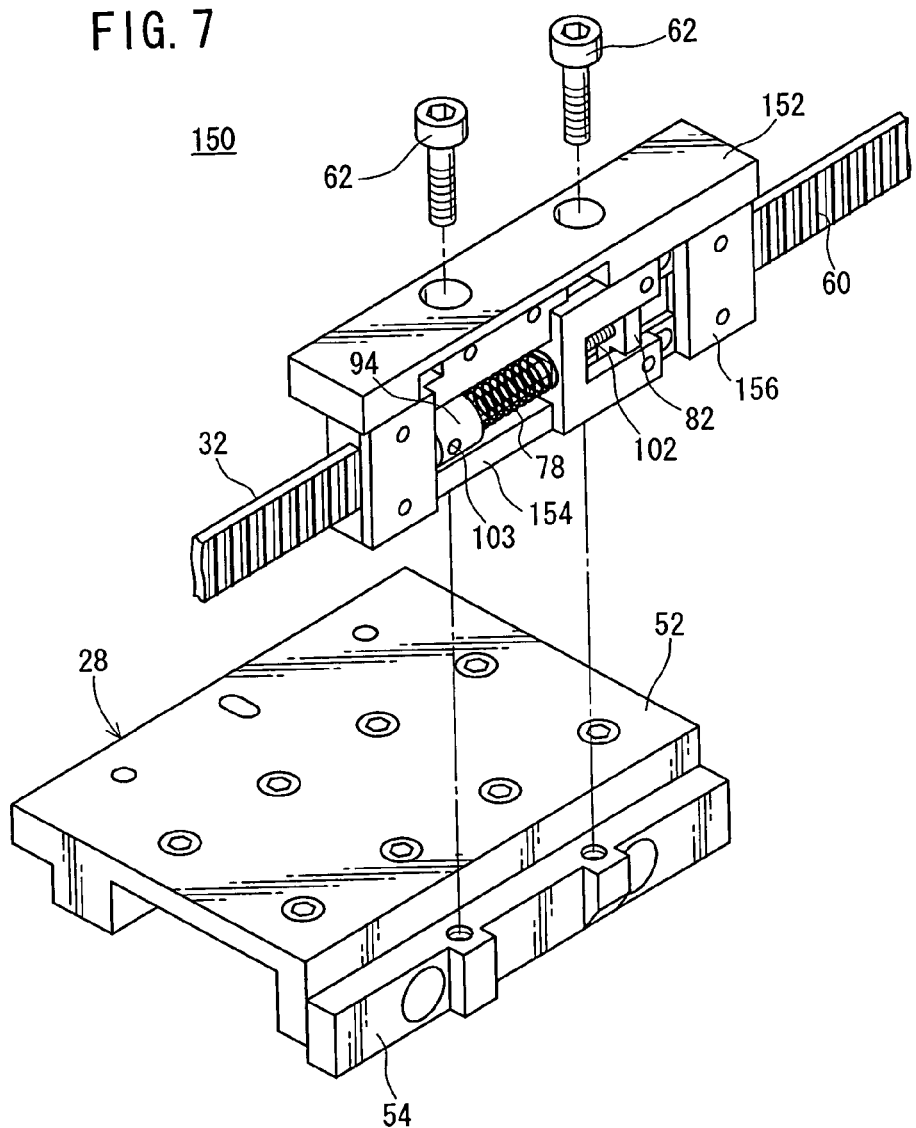
FIG. 7 is a perspective view illustrating an assembling state of a belt-adjusting mechanism which is applied to an electric actuator according to a second embodiment of the present invention.
Figure 8:
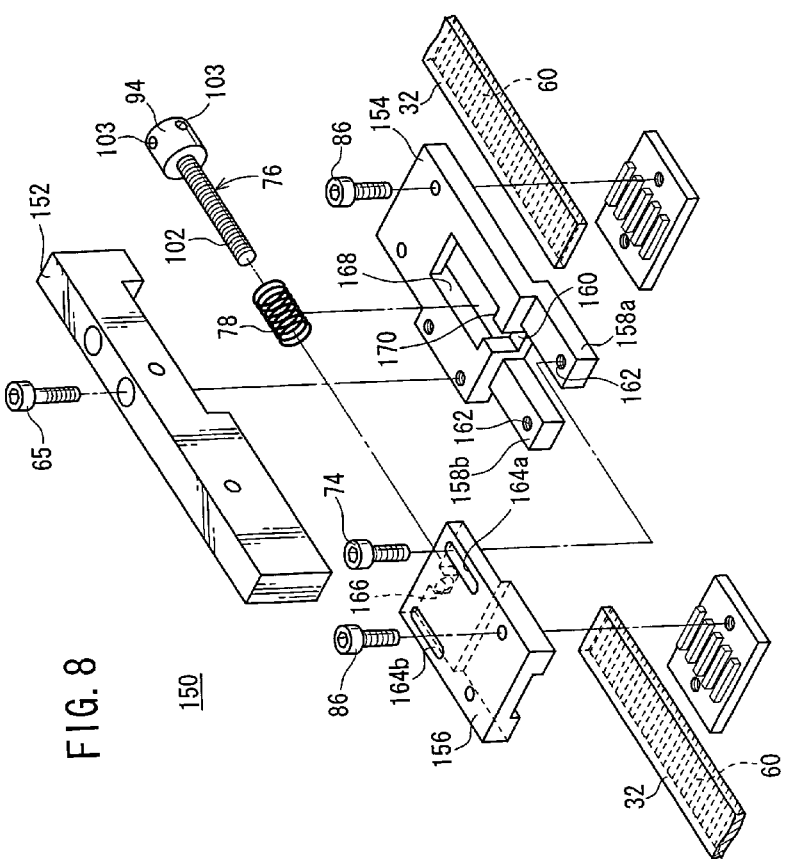
FIG. 8 is an exploded perspective view illustrating the belt-adjusting mechanism shown in FIG. 7.
Figure 9:
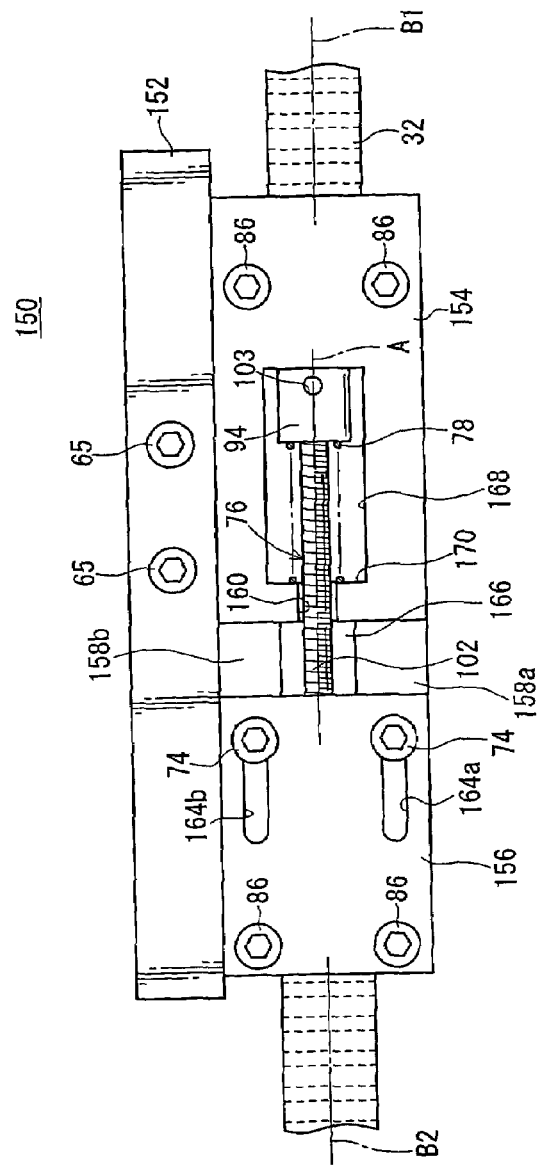
FIG. 9 is a front view illustrating the belt-adjusting mechanism shown in FIG. 7.

As shown in FIGS. 7 to 9, in the belt-adjusting mechanism 150, an attachment member 152 is connected to the upper surface of an adapter 54 by attachment bolts 62. A first member 154 is connected substantially perpendicular to the attachment member 152, and a second member 156 is arranged displaceably in the axial direction with respect to the first member 154.

The first member 154 has two branches 158a, 158b each of which protrudes by a predetermined length on the side facing the second member 156. A cutout groove 160, which is cut out by a predetermined depth, is formed at a substantially central portion between the two branches 158a, 158b.

Lock screw holes 162, with which lock screws 74 are screwed, are formed penetratingly at the forward ends of the two branches 158a, 158b.

One end of the second member 156 is arranged to be the upper surfaces of the two branches 158a, 158b. Engaging holes 164a, 164b, which have substantially identical shapes, are formed as elongate holes in the axial direction at positions corresponding to the lock screw holes 162 of the second member 156.

An adjusting screw 76 is screwed with a screw section 166 which is formed through the side surface of the second member 156 on the side facing the first member 154 so that a head section 94 of the adjusting screw 76 is disposed on the side facing the first member 154.

A first hole 168 having a predetermined length in the axial direction is formed between one end and the other end of the first member 154. The adjusting screw 76, which is screwed with the screw section 166, is arranged in the first hole 168 through the cutout groove 160. A coil spring 78 is inserted into a screw section 102 of the adjusting screw 76 so that the coil spring 78 abuts against the lower surface of the head section 94 and the wall surface 170 of the first member 154.

That is, the coil spring 78 urges the head section 94 of the adjusting screw 76 to separate from the second member 156. Therefore, the upper surface of the head section 94 always abuts against the side surface of the first hole 168. As a result, when the lock screws 74, which are screwed with the lock screw holes 162, are loosened, then the head section 94 is not displaced in the axial direction by the rotation of the adjusting screw 76, and the second member 156 is displaced in the axial direction by screwing the adjusting screw 76.

The axis A of the coil spring 78 and the adjusting screw 76 screwed with the screw section 166 of the second member 156, and the center lines B1, B2 of the ends of the timing belt 32 installed to the first member 154 and the second member 156 are provided on a substantially identical straight line within a range of cross section of the timing belt 32 (see FIG. 9).

That is, the belt-adjusting mechanism 150 is different from the belt-adjusting mechanism 34 in that the adjusting screw 76 is screwed with the second member 156.

As a result of the structure constructed as described above, when the tension of the timing belt 32 is adjusted, the lock screws 74, which are tightened to the lock screw holes 162 of the first member 154, are loosened to allow the second member 156 to be displaced in the axial direction with respect to the first member 154.

The adjusting screw 76 is rotated to displace the second member 156 to approach the first member 154. The screwing action of the adjusting screw 76 is stopped at a position at which a desired tension of the timing belt 32 is obtained, and the lock screws 74 are tightened. Accordingly, the second member 156 is integrally fixed to the first member 154. As a result, the timing belt 32 can be retained while the tension is adjusted.

Figure 10:
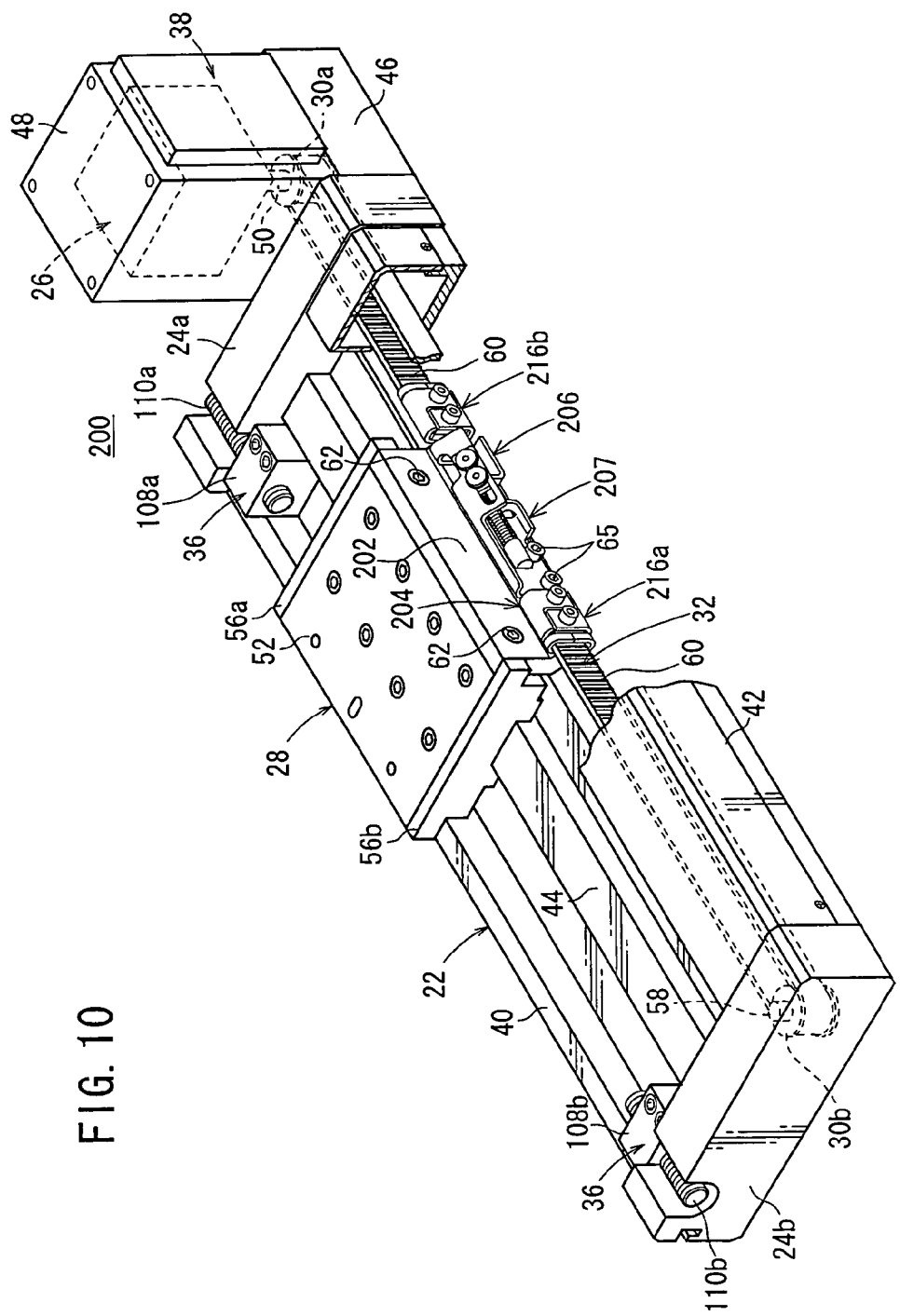
FIG. 10 is a perspective view illustrating an electric actuator according to a third embodiment of the present invention.
Figure 11:
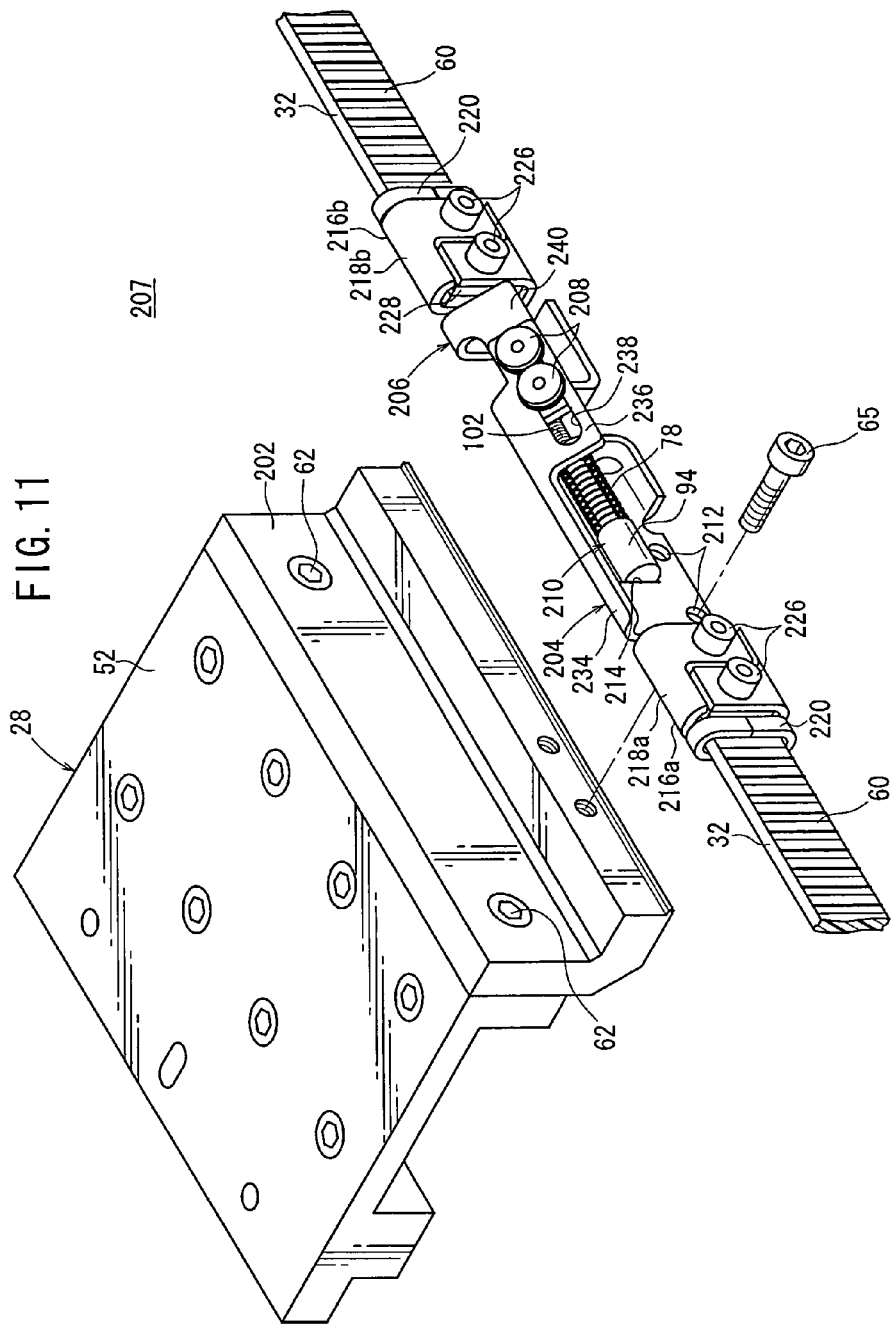
FIG. 11 is a perspective view illustrating an assembling state of a belt-adjusting mechanism with respect to a slider shown in FIG. 10.

Next, FIG. 10 shows an electric actuator 200 according to a third embodiment. The constituent elements that are same as those of the electric actuator 20 according to the first embodiment described above are designated by the same reference numerals, and detailed explanation thereof will be omitted.

The electric actuator 200 according to the third embodiment is different from the electric actuator 20 according to the first embodiment in that a belt-adjusting mechanism 207 for adjusting the tension of the timing belt 32 comprises a first member 204 which is connected to an attachment member 202 having a substantially L-shaped cross section fixed to the side surface of a slider 28, and a second member 206 which is provided displaceably in the axial direction with respect to the first member 204. Each of the first member 204 and the second member 206 is formed by pressing a plate-shaped material.

As shown in FIGS. 10 to 14, the belt-adjusting mechanism 207 includes the first member 204 which is connected with connecting bolts 65 to the attachment member 202 having the substantially L-shaped cross section fixed to the side surface of the slider 28 by the attachment bolts 62, and the second member 206 which is displaceable in the axial direction with respect to the first member 204.

The belt-adjusting mechanism 207 further includes a pair of lock screws 208 which engage or fix the second member 206 with respect to the first member 204, an adjusting screw 210 which is screwed at a substantially central portion of the first member 204 and which adjusts the distance between the first member 204 and the second member 206 depending on the screwing amount, and a coil spring 78 which is inserted into the adjusting screw 210 and which urges the second member 68 to approach the first member 66.

As shown in FIGS. 11 to 14, the first member 204 is formed by pressing plate-shaped materials. Two holes 212, through which connecting bolts 65 (see FIG. 11) are inserted into the attachment member 202, are formed through the side surface of the first member 204, while the two holes 212 are separated from each other by a predetermined distance. An installation hole 214, in which the adjusting screw 210 is arranged, is formed over the holes 212 so that the installation hole 214 has a substantially rectangular shape in the axial direction.

Figure 12:
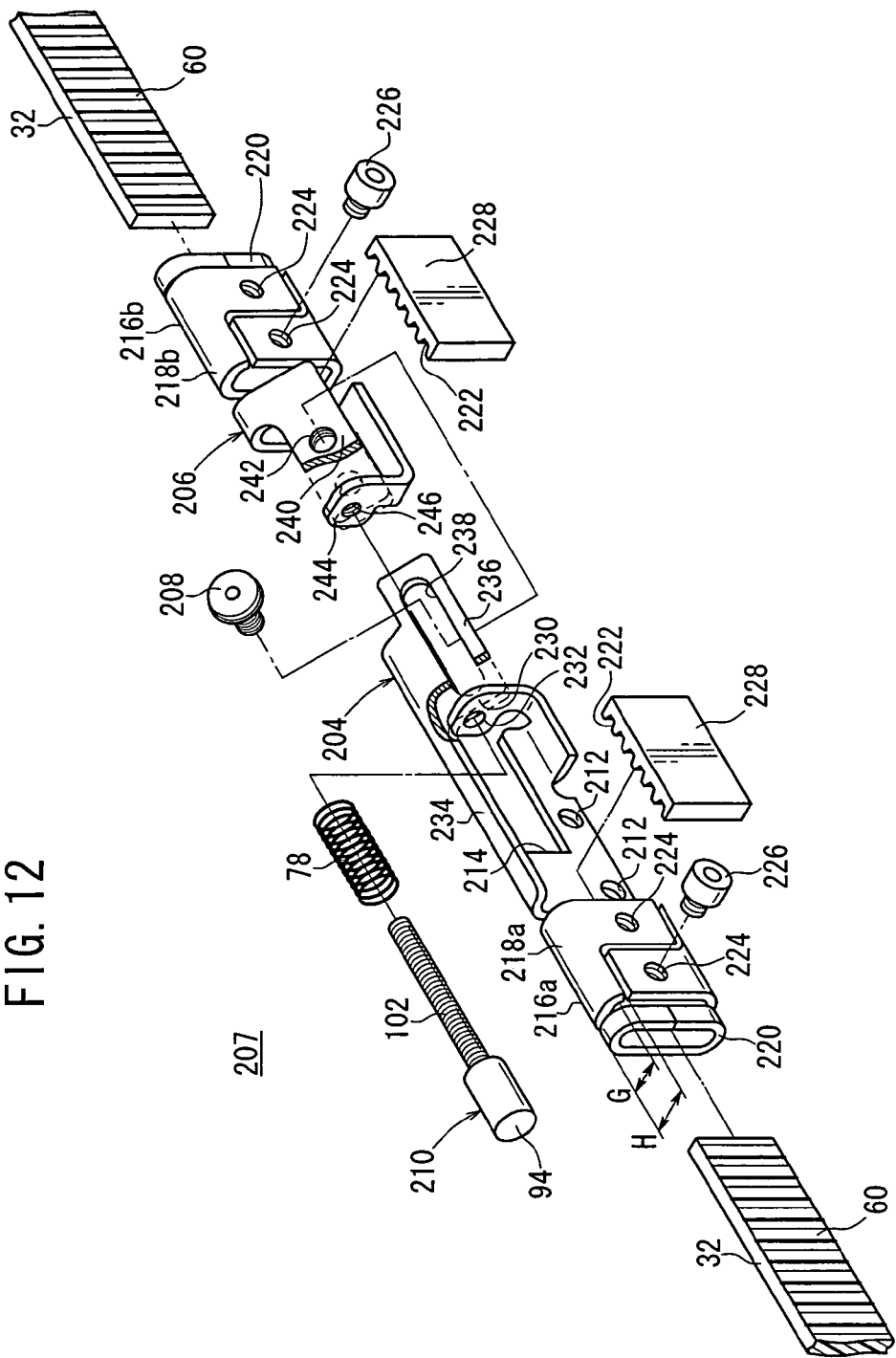
FIG. 12 is an exploded perspective view illustrating the belt-adjusting mechanism shown in FIG. 11.
Figure 13:
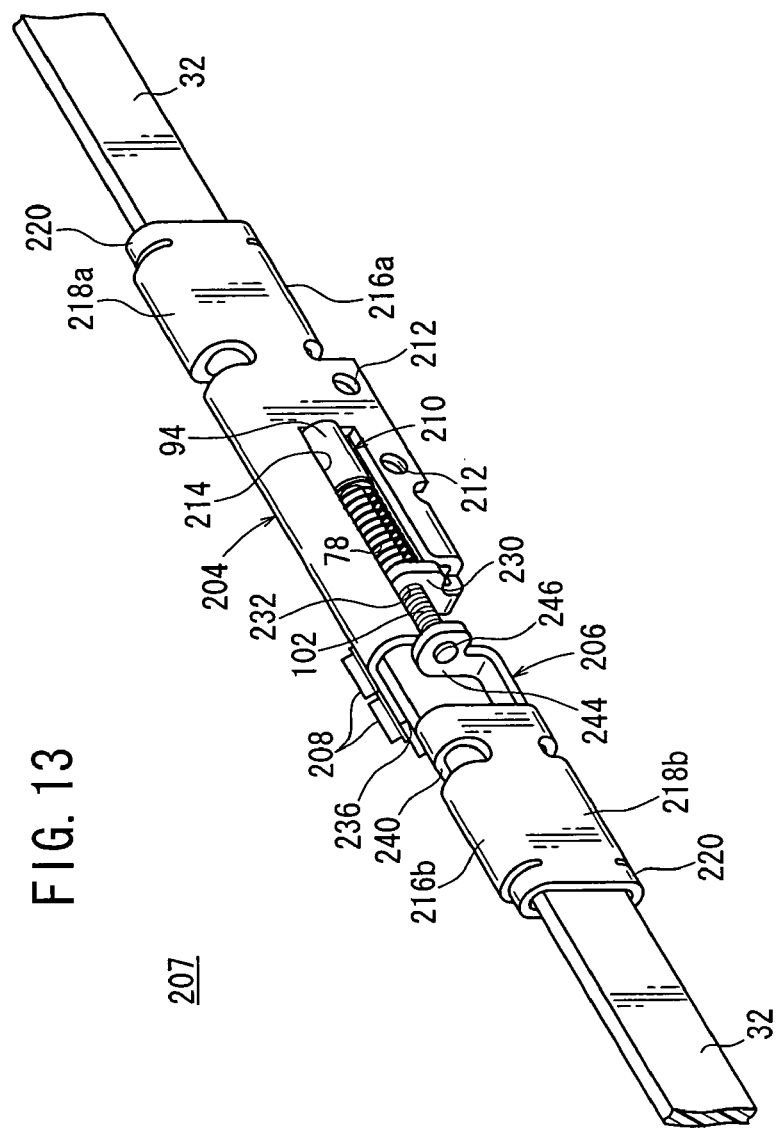
FIG. 13 is a perspective view illustrating the belt-adjusting mechanism shown in FIG. 11 as viewed in another direction.
Figure 14:
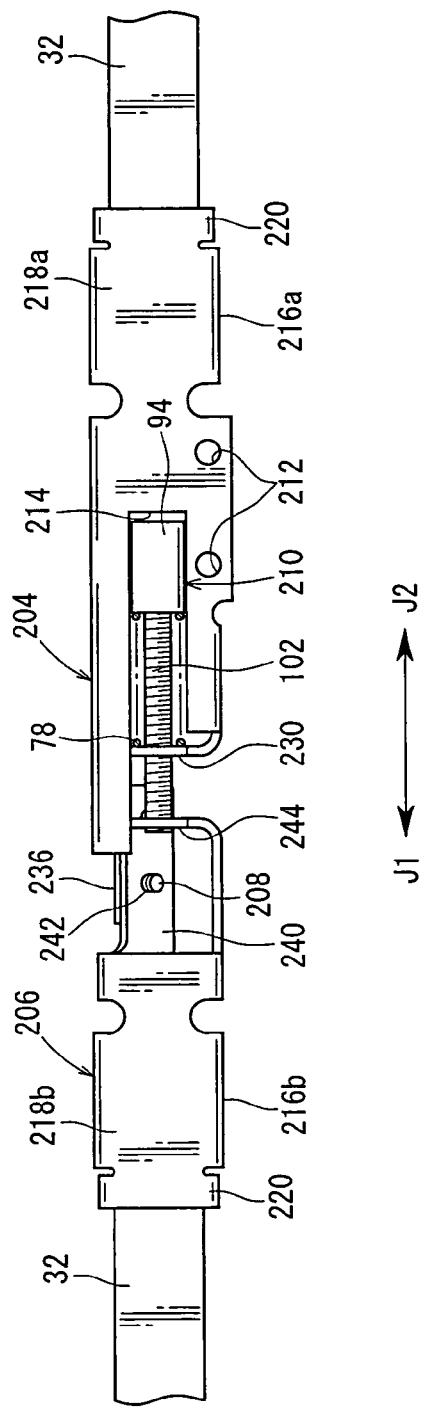
FIG. 14 is a front view illustrating the belt-adjusting mechanism shown in FIG. 11.

As shown in FIG. 12, a belt-installing section 216a, to which an end of the timing belt 32 is connected, is formed at one end of the first member 204. The belt-installing section 216a includes a retaining section 218a which retains the end of the timing belt 32, and a fastening section 220 which prevents the timing belt 32 from disengagement. Each of the retaining section 218a and the fastening section 220 is formed so that the plate-shaped material is wound around the timing belt 32.

Figure 15:
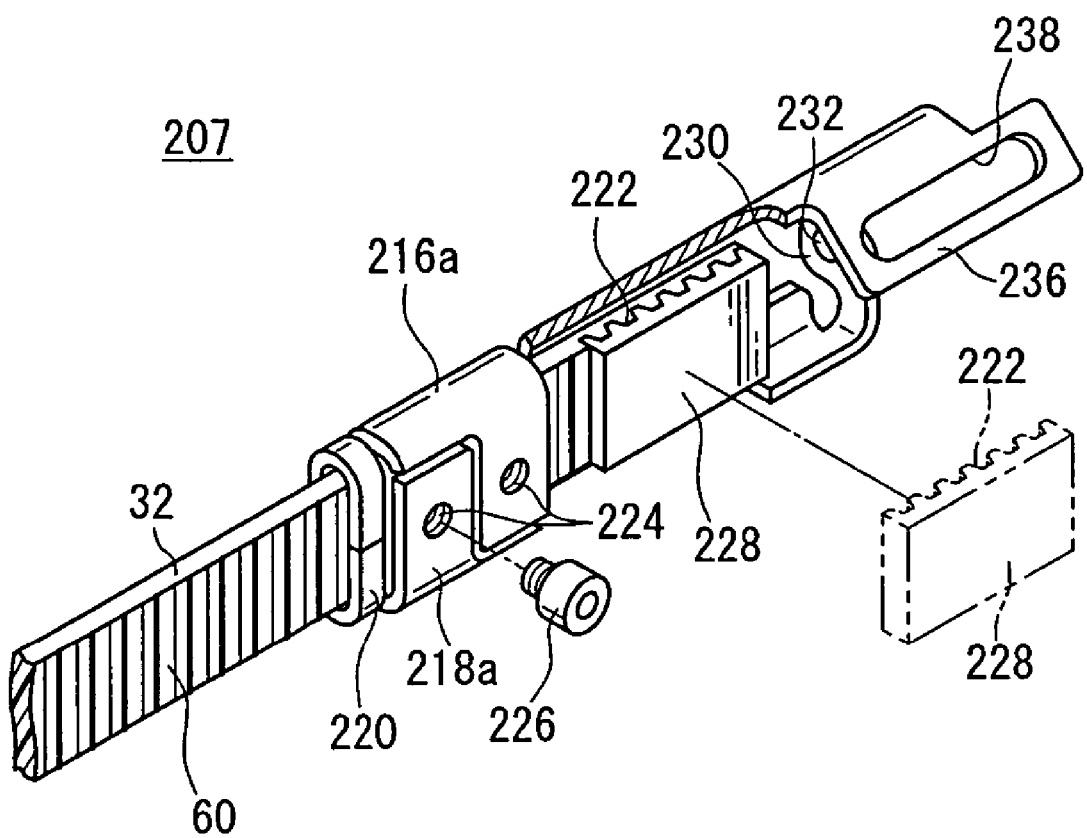
FIG. 15 is a perspective view illustrating an assembling state brought about when an engaging plate is fitted to an end of a timing belt of the belt-adjusting mechanism shown in FIG. 11.

As shown in FIG. 15, the timing belt 32 is inserted into the retaining section 218a while an engaging plate 228 (see FIG. 12), which has engaging grooves 222 for parallel teeth 60 of the timing belt 32, is fitted on the parallel teeth 60 of the timing belt 32. When fixing screws 226 are tightened through screw holes 224 formed through the retaining section 218a, then the engaging plate 228, which is inserted into the retaining section 218a, is pressed, and the timing belt 32 is integrally connected to the belt-installing section 216a.

As shown in FIG. 12, the thickness G of the fastening section 220 is narrower than the thickness H of the retaining section 218a (G<H). Accordingly, when the end of the timing belt 32 inserted into the retaining section 218a is pulled in the direction (direction of the arrow J2 in FIG. 14) to separate from the belt-installing section 216a, the engaging plate 228 installed to the end of the timing belt 32 is fastened by the fastening section 220. Therefore, the end of the timing belt 32 is prevented from disengagement from the belt-installing section 216a.

A support section 230, which is substantially perpendicular to the axis of the first member 204, is provided for the first member 204 at a substantially central portion facing the side of the second member 206. An insertion hole 232, which is substantially parallel to the axis, is formed at a substantially central portion of the support section 230. The screw section 102 of the adjusting screw 210 is inserted displaceably in the axial direction into the insertion hole 232 of the support section 230.

A flange section 234 protrudes by a predetermined width to be substantially perpendicular to the side surface of the first member 204 at an upper portion of the first member 204. A lock screw attachment section 236 is formed at a portion of the flange section 234 disposed on the side facing the second member 206, and is inclined downwardly by a predetermined angle from the flange section 234. An elongate hole 238, which extends in the axial direction, is formed at a substantially central portion of the lock screw attachment section 236.

The second member 206 is formed by pressing plate-shaped materials in the same manner as the first member 204. A belt-installing section 216b, to which the end of the timing belt 32 is connected, is formed at the end of the second member 206. The belt-installing section 216b includes a retaining section 218b which retains the end of the timing belt 32, and a fastening section 220 which prevents the timing belt 32 from disengagement.

The thickness H of the retaining section 218b is also wider than the thickness G of the fastening section 220 in the same manner as in the retaining section 218a of the first member 204. Accordingly, when the end of the timing belt 32 inserted into the retaining section 218b is pulled in the direction (direction of the arrow J1 in FIG. 14) to separate from the belt-installing section 216b, the engaging plate 228, which is installed to the end of the timing belt 32, is fastened by the fastening section 220. Therefore, the end of the timing belt 32 is prevented from disengagement from the belt-installing section 216b.

An attachment surface 240, which is inclined by an angle substantially equivalent to the angle of inclination of the lock screw attachment section 236 of the first member 204, is formed at an upper portion of the second member 206. The attachment surface 240 is arranged so that the attachment surface 240 is disposed on the lower surface of the lock screw attachment section 236.

The attachment surface 240 is formed with two screw holes 242 which are separated from each other by a predetermined distance and with which the lock screws 208 are screwed through the elongate hole 238. The two screw holes 242 are formed so that the axis of the elongate hole 238 is coaxial with the center line for connecting the two screw holes 242.

Further, the second member 206 is formed with a screw section 244 which has a screw hole 246 formed at a position facing the support section 230 of the first member 204 so that the screw section 244 is substantially in parallel. That is, the screw section 102 of the adjusting screw 210 is inserted into the insertion hole 232 of the support section 230, and then the screw section 102 is screwed with the screw hole 246 of the screw section 244.

The belt-adjusting mechanism 207 is structured as described above. Accordingly, when the tension of the timing belt 32 is adjusted, the lock screws 208, which are fixed to the elongate hole 238 of the first member 204, are loosened to give a state in which the second member 206 is displaceable in the axial direction with respect to the first member 204.

The adjusting screw 210 is rotated to displace the second member 206 (direction of the arrow J2 in FIG. 14) to approach the first member 204. The rotation of the adjusting screw 210 is stopped at a position at which a desired tension of the timing belt 32 is obtained, and the lock screws 208 are tightened. Accordingly, the second member 206 is integrally fixed to the first member 204. As a result, the timing belt 32 can be preferably retained while the tension thereof is adjusted.

Each of the first and second members 204, 206 of the belt-adjusting mechanism 207 is formed by pressing plate-shaped materials. Accordingly, it is possible to reduce the production steps and the production cost.

Figure 16:
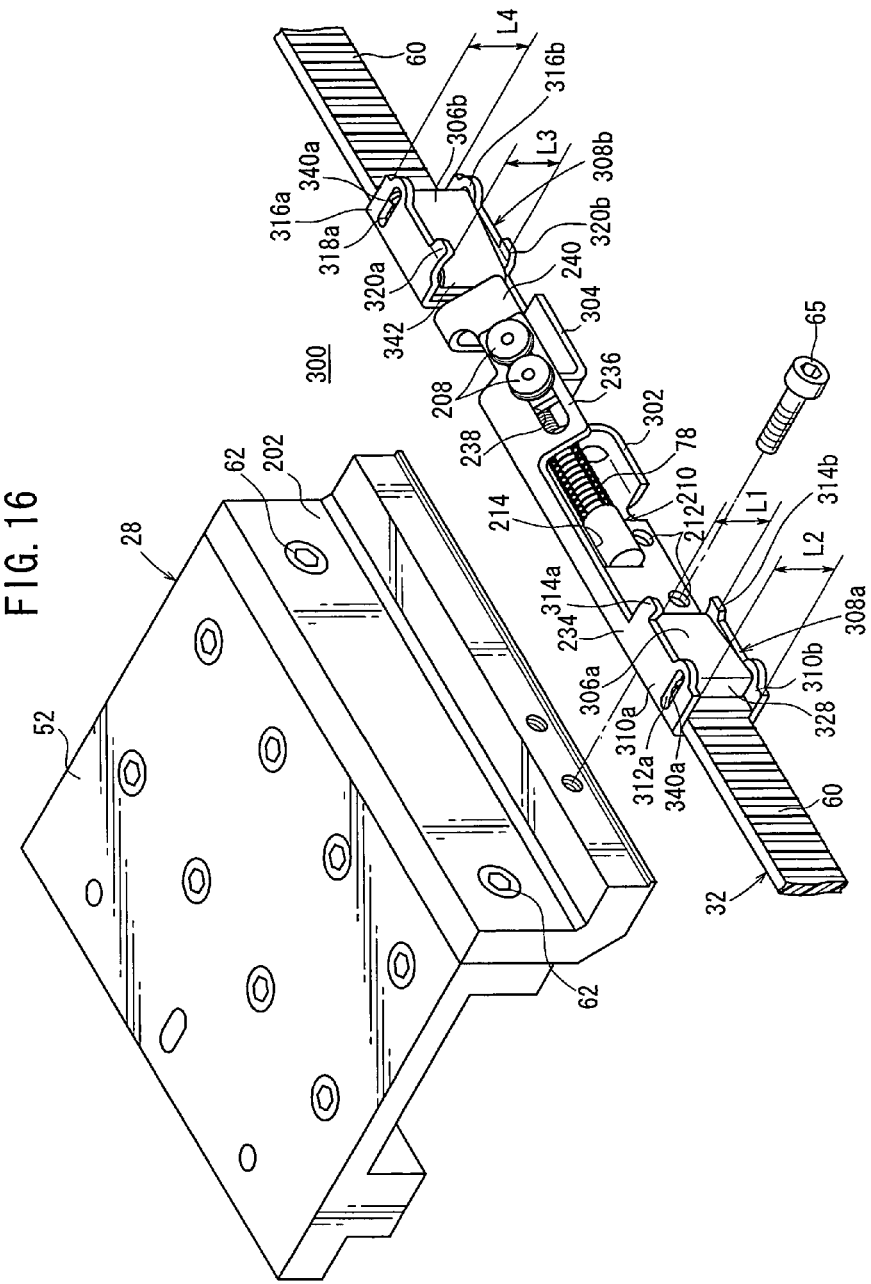
FIG. 16 is a perspective view illustrating a state in which a belt-adjusting mechanism, which is applied to an electric actuator according to a fourth embodiment of the present invention, is assembled to a slider.

Next, FIG. 16 shows a belt-adjusting mechanism 300 applied to an electric actuator according to a fourth embodiment. The constituent elements that are same as those of the belt-adjusting mechanism 207 described above are designated by the same reference numerals, and detailed explanation thereof will be omitted.

The belt-adjusting mechanism 300 is different from the belt-adjusting mechanism 207 in that belt-fixing sections 308a, 308b, which have rotatably supported lock plates 306a, 306b, are provided at the ends of a first frame member 302 and a second frame member 304, and the ends of the timing belt 32 are fastened by rotating the lock plates 306a, 306b, respectively.

As shown in FIGS. 16 to 21, the belt-adjusting mechanism 300 includes the first frame member (first member) 302 which is connected with connecting bolts 65 to an attachment member 202 fixed to the side surface of a slider by attachment bolts 62, and the second frame member (second member) 304 which is provided displaceably in the axial direction with respect to the first frame member 302.

The belt-fixing sections 308a, 308b are provided at the ends of the first frame member 302 and the second frame member 304, to which the ends 32a, 32b of the timing belt 32 (see FIG. 20) are connected.

Figure 17:
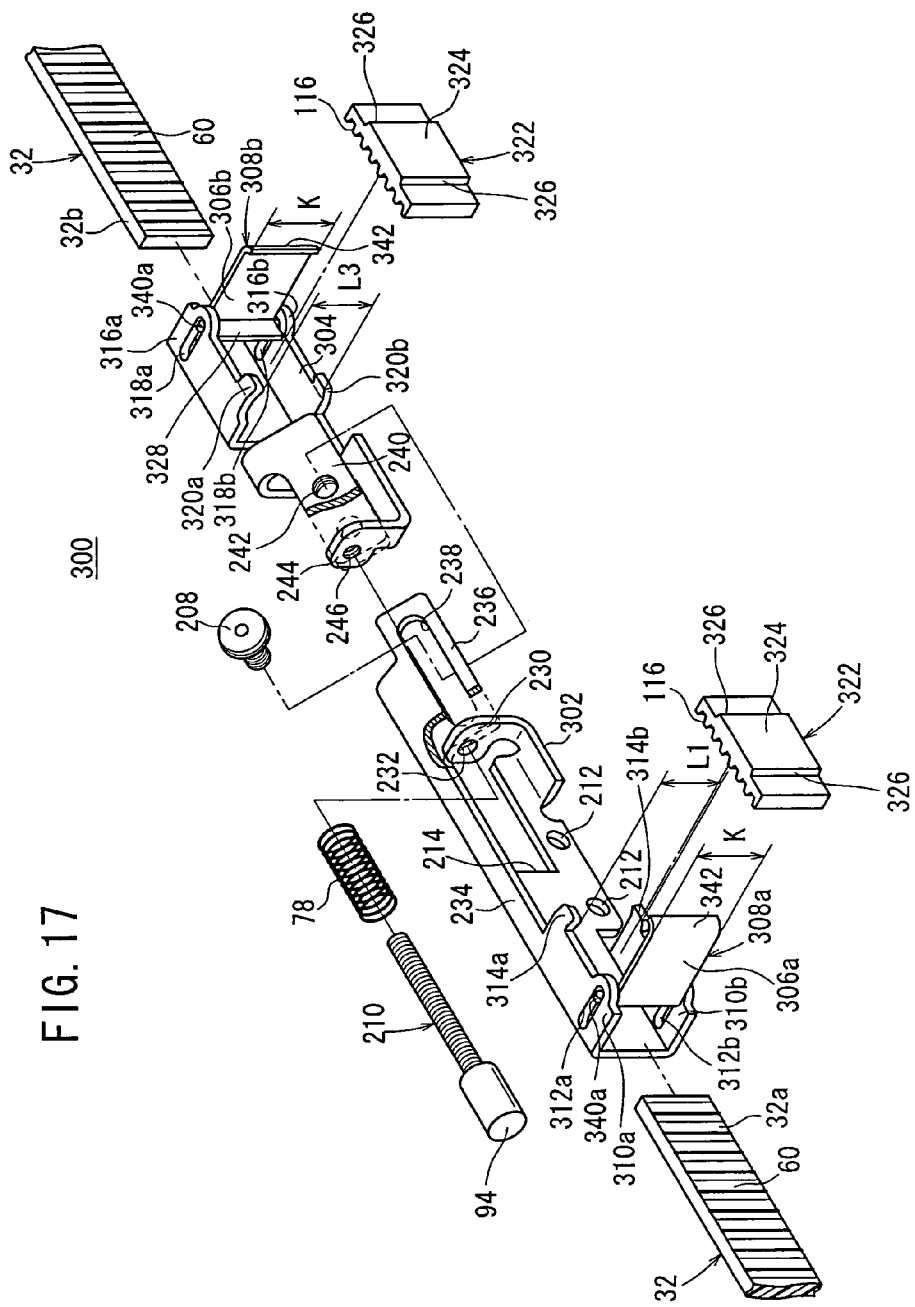
FIG. 17 is, with partial omission, an exploded perspective view illustrating the belt-adjusting mechanism shown in FIG. 16.
Figure 18:
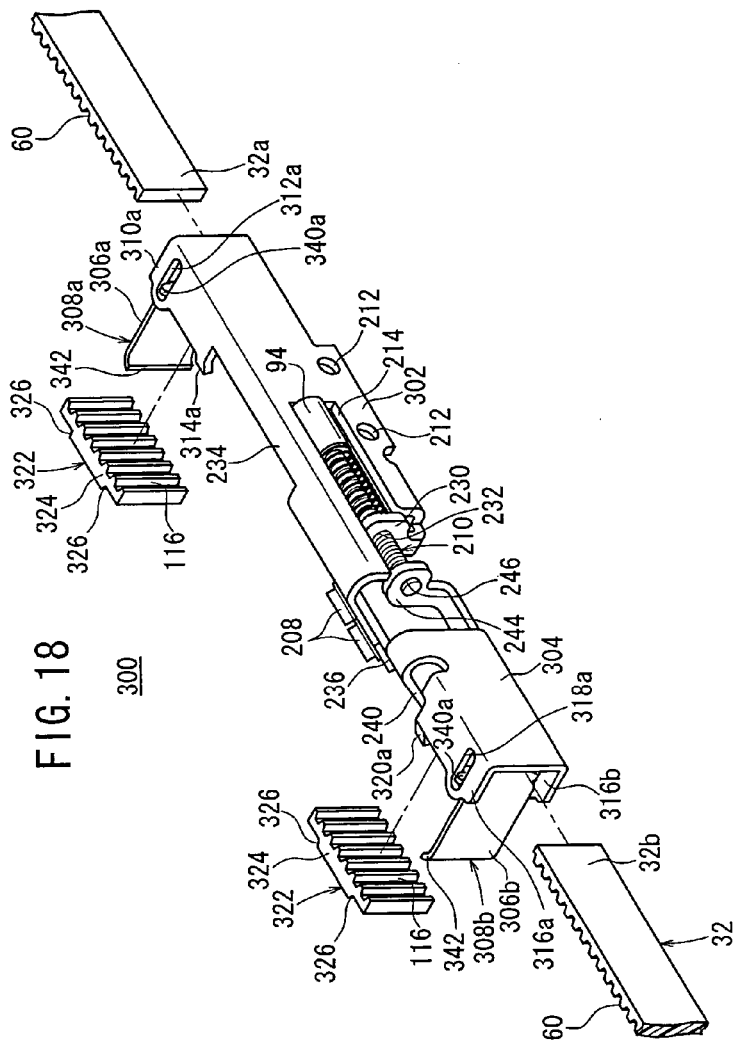
FIG. 18 is a partial exploded perspective view illustrating the belt-adjusting mechanism shown in FIG. 16 as viewed in another direction.

As shown in FIGS. 16 and 17, the first frame member 302 is formed by pressing plate-shaped materials. At one end of the first frame member 302, a pair of first attachment flange sections 310a, 310b protrude from the flange sections 234 at upper and lower portions of the first frame member 302. A pair of upper and lower first elongate engaging holes 312a, 312b, which are substantially perpendicular to the axis of the first frame member 302, are formed through the first attachment flange sections 310a, 310b (see FIG. 17).

A pair of upper and lower first pawls 314a, 314b, each of which protrudes by a predetermined length, are formed on the first attachment flange sections 310a, 310b on the side facing the second frame member 304. The pair of first pawls 314a, 314b are bent by predetermined angles to approach one another. In other words, as shown in FIG. 16, the distance L1 between the pair of first pawls 314a, 314b is smaller than the distance L2 between the first attachment flange sections 310a, 310b (L1<L2).

The second frame member 304 is formed by pressing plate-shaped materials in the same manner as the first frame member 302.

On the second frame member 304, a pair of second attachment flange sections 316a, 316b protrude from flange sections of the second frame member 304 and are disposed at upper and lower portions of the second frame member 304. A pair of upper and lower second elongate engaging holes 318a, 318b are formed through the second attachment flange sections 316a, 316b (see FIG. 17), and are substantially perpendicular to the axis of the second frame member 304.

A pair of upper and lower second pawls 320a, 320b, each of which protrudes by a predetermined length, are formed on the second attachment flange sections 316a, 316b on the side facing the first frame member 302. The pair of second pawls 320a, 320b are bent by predetermined angles to approach one another. In other words, as shown in FIG. 16, the distance L3 between the pair of second pawls 320a, 320b is smaller than the distance L4 between the second attachment flange sections 316a, 316b (L3<L4).

The belt-fixing sections 308a, 308b are provided on the other end of the first frame member 302 and on the other end of the second frame member 304 of the belt-adjusting mechanism 300, respectively.

The belt-fixing sections 308a, 308b include engaging members 322 each of which has engaging grooves 116 for the parallel teeth 60 of the timing belt 32, and a pair of lock plates (lock members) 306a, 306b each of which has a substantially L-shaped cross section and which are rotatably provided at the first attachment flange sections 310a, 310b of the first frame member 302 and the second attachment flange sections 316a, 316b of the second frame member 304, respectively.

The engaging member 322 has the engaging grooves 116 formed on one end surface of the engaging member 322. The engaging grooves 116 engage with the parallel teeth 60 of the timing belt 32. A step section 324, which protrudes by a predetermined length, is formed at a substantially central portion on the other end surface of the engaging member 322. The step section 324 is formed with tapered surfaces 326 (see FIG. 22) each of which is inclined by a predetermined angle so that the width is narrowed toward the lock plates 306a, 306b.

A bent section (engaging section) 328, which is bent substantially perpendicularly, is formed at each one end of the lock plates 306a, 306b. Projections 340a, 304b (see FIG. 24), each of which protrudes by a predetermined length in the vertical direction, is formed at upper and lower portions of the bent section 328 of each of the lock plates 306a, 306b.

The projections 340a, 340b are inserted into the first engaging holes 312a, 312b of the first attachment flange sections 310a, 310b, respectively. Further, the projections 340a, 340b are inserted into the second engaging holes 318a, 318b of the second attachment flange sections 316a, 316b, respectively. That is, the lock plates 306a, 306b are rotatably supported by the first attachment flange sections 310a, 310b and the second attachment flange sections 316a, 316b by the projections 340a, 340b.

Figure 19:
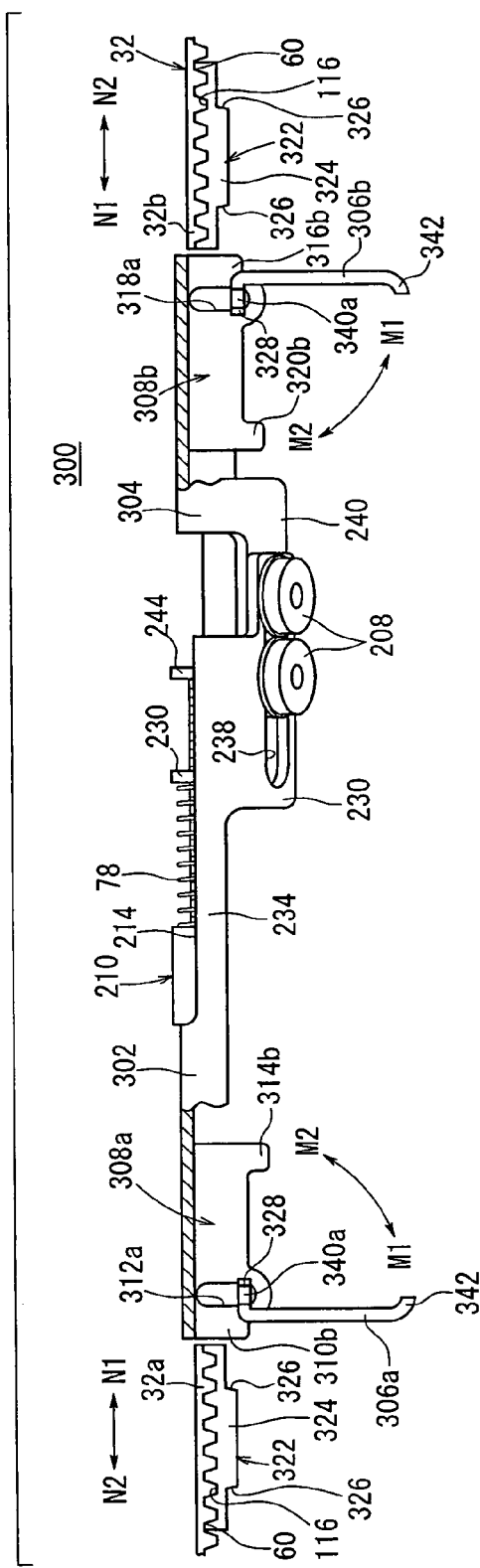
FIG. 19 is a plan view illustrating the belt-adjusting mechanism shown in FIG. 16.
Figure 20:
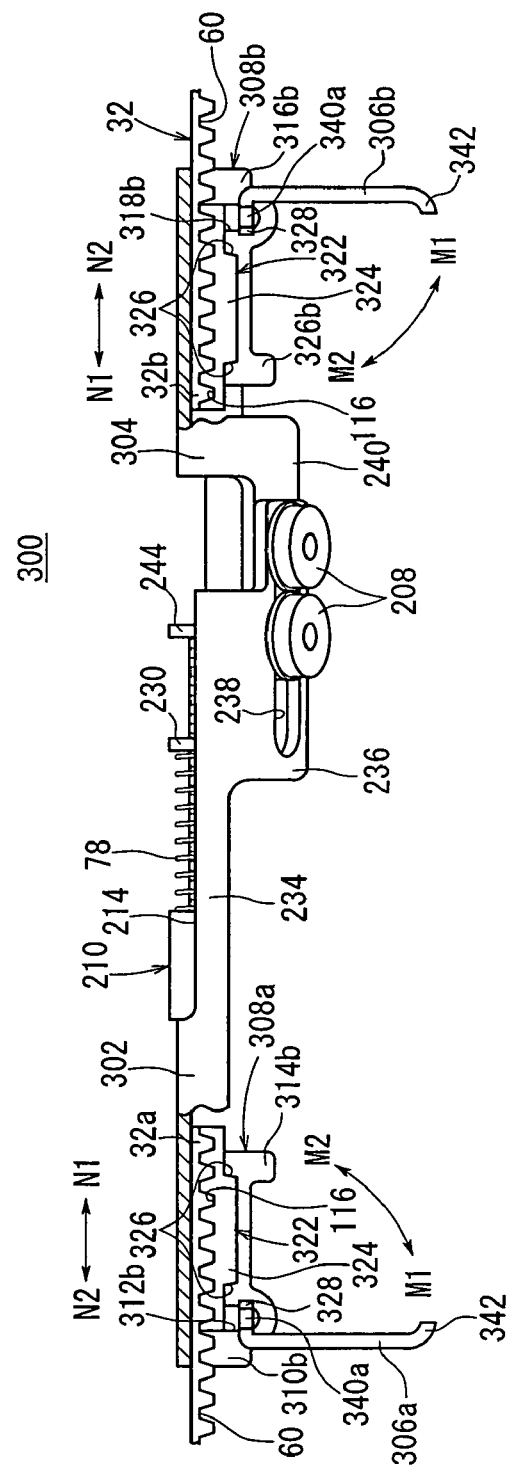
FIG. 20 is a plan view illustrating a state before a timing belt is fixed to the belt-adjusting mechanism shown in FIG. 16.

As shown in FIGS. 19 to 20, the first engaging holes 312a, 312b and the second engaging holes 318a, 318b are formed as elongate holes extending in the thickness direction of the timing belt 32.

Figure 24:
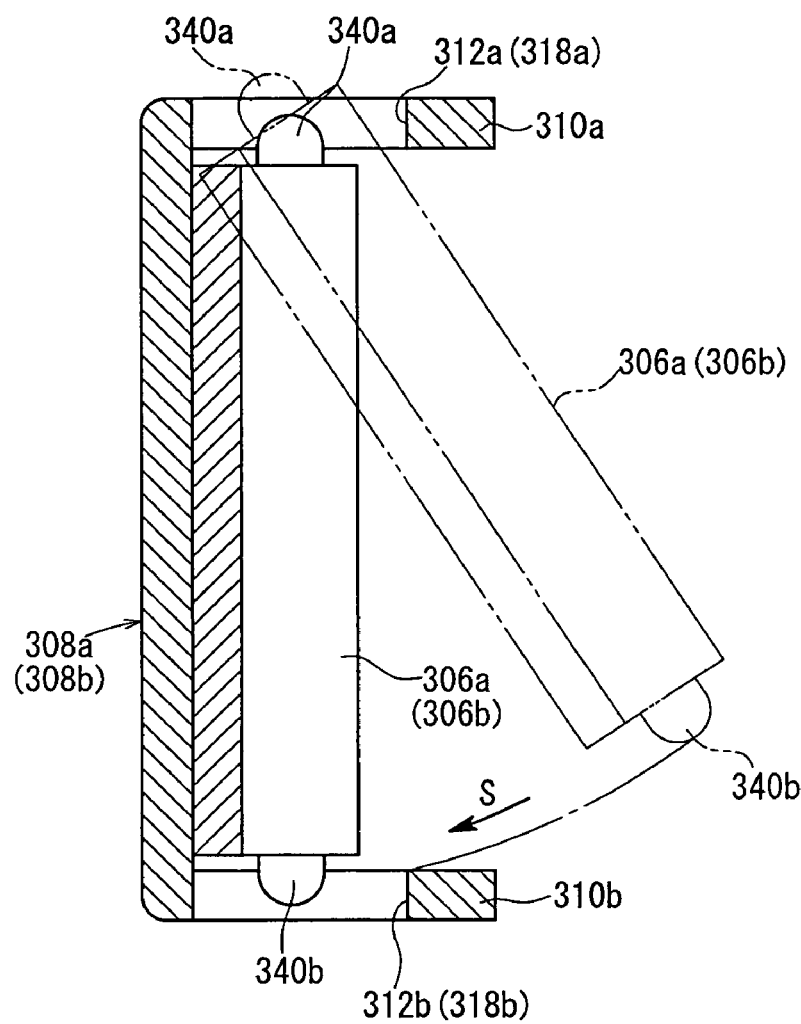
FIG. 24 is a partial magnified view illustrating a state in which the lock plate is installed to first attachment flange sections of the belt-adjusting mechanism.

For example, as shown in FIG. 24, when the lock plate 306a is installed to the belt-fixing section 308a, the lock plate 306a is firstly inclined by a predetermined angle to insert the upper projection 340a into the first engaging hole 312a disposed on the upper side.

Subsequently, the projection 340a in the first engaging hole 312a is used as a support point about which the lock plate 306a is moved by a predetermined angle (in the direction of the arrow S) so that the lower projection 340b of the lock plate 306a is inserted into the first engaging hole 312b disposed on the lower side. That is, the upper projection 340a is inserted into the first engaging hole 312a, and the other projection 340b is inserted into the first engaging hole 312b, in which the lock plate 306a is engaged with the first attachment flange sections 310a, 310b. In the same manner, the lock plate 306b is assembled to the belt-fixing section 308b.

As a result, the lock plates 306a, 306b can be easily and reliably assembled to the first attachment flange sections 310a, 310b and the second attachment flange sections 316a, 316b, respectively.

A curved section 342, which is curved with a predetermined radius in the same direction as that of the bent section 328, is formed at the other end of each of the lock plates 306a, 306b.

Next, an explanation will be made about a method for fixing the timing belt 32 by using the belt-fixing sections 308a, 308b. In this explanation, the timing belt 32 is firstly fixed with the belt-fixing section 308a disposed on one side, and then the timing belt 32 is connected to the belt-fixing section 308b disposed on the other side. However, the timing belt 32 may be firstly connected to the belt-fixing section 308b disposed on the other side in the same manner.

As shown in FIG. 19, the lock plate 306a, which is rotatably supported by the first engaging holes 312a, 312b (see FIG. 17) of the first attachment flange sections 310a, 310b, is firstly rotated in the direction (direction of the arrow M1) in which the curved section 342 is separated from the first frame member 302. That is, the lock plate 306a is substantially perpendicular to the first frame member 302. The engaging member 322 is installed to the end 32a of the timing belt 32 so that the engaging member 322 is fitted to the parallel teeth 60 of the timing belt 32.

Subsequently, as shown in FIG. 20, the end 32a of the timing belt 32, to which the engaging member 322 is installed, is inserted by a predetermined length toward the second frame member 304 (in the direction of the arrow N1) between the bent section 328 of the lock plate 306a and the first frame member 302.

Figure 21:
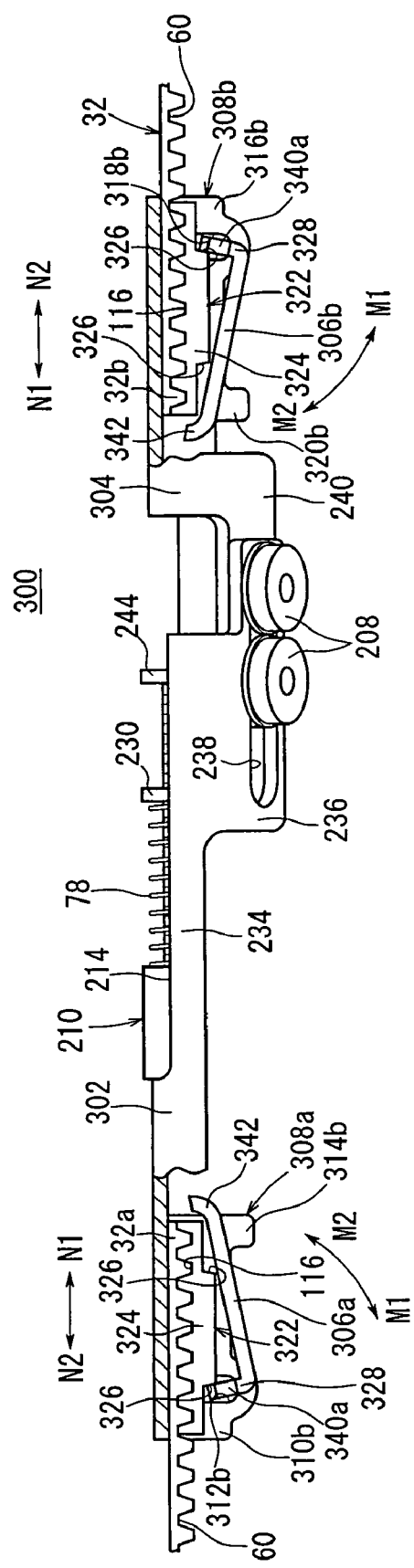
FIG. 21 is a plan view illustrating a state in which the timing belt is fixed to the belt-adjusting mechanism shown in FIG. 16.

Lastly, as shown in FIG. 21, the lock plate 306a is rotated in the direction (direction of the arrow M2) in which the curved section 342 approaches the first frame member 302 about the support points of the projections 340a, 340b engaged with the first engaging holes 312a, 312b of the first attachment flange sections 310a, 310b. When the inner wall surface of the bent section 328 abuts against the tapered surface 326 of the engaging member 322, the engaging member 322 is fastened by the lock plate 306a (see FIG. 22).

When the lock plate 306a is rotated in the direction (direction of the arrow M2) in which the lock plate 306a approaches the first frame member 302, the curved section 342 passes through the space between the first pawls 314a, 314b so that the curved section 342 approaches the first frame member 302. In this procedure, as shown in FIG. 17, the distance L1 between the first pawls 314a, 314b is formed to be slightly narrower than the height K of the lock plate 306a (L1<K). Therefore, the rotation of the lock plate 306a is stopped by the first pawls 314a, 314b.

Accordingly, the bent section 328 of the lock plate 306a is prevented from rotation in the direction (direction of the arrow M1) to separate from the first frame member 302, while the bent section 328 of the lock plate 306a abuts against the engaging member 322.

Figure 22:
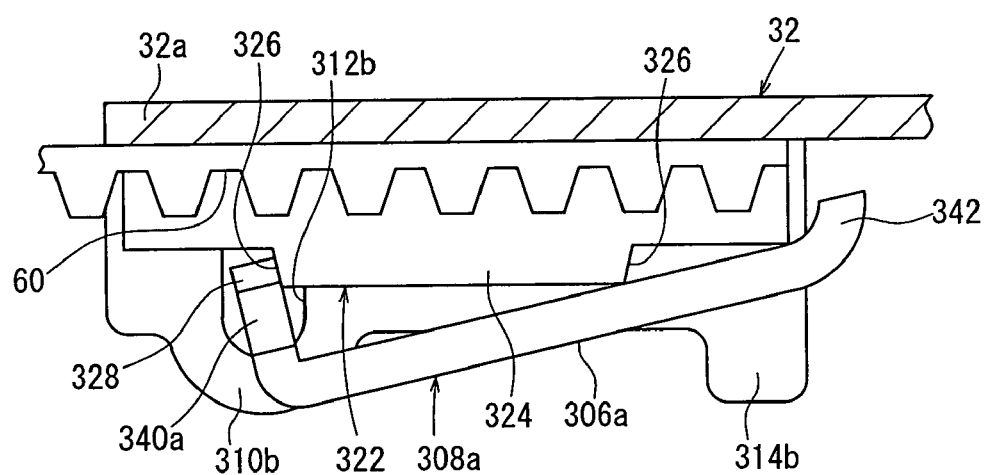
FIG. 22 is a partial magnified view illustrating components in the vicinity of the belt-adjusting mechanism shown in FIG. 21.

Further, when the end 32a of the timing belt 32 is pulled in the direction (direction of the arrow N2) to separate from the belt-fixing section 308a, the timing belt 32 is displaced together with the engaging member 322 to be fastened by the abutment of the tapered surface 326 of the step section 324 of the engaging member 322 against the inner wall surface of the bent section 328 (see FIG. 22).

As a result, even when the timing belt 32 is pulled in the axial direction (direction of the arrow N2) by the rotary driving source 26, the timing belt 32 is not disengaged from the belt-fixing section 308a since the engaging member 322 is fastened by the lock plate 306a. Further, the timing belt 32 is reliably fixed to the belt-fixing section 308a when the timing belt 32 is pressed by the lock plate 306a.

Next, an explanation will be made for fixing the other end 32b of the timing belt 32 by the belt-fixing section 308b while one end of the timing belt 32 is connected to the belt-fixing section 308a.

Firstly, as shown in FIG. 19, the lock plate 306b, which is rotatably supported by the second engaging holes 318a, 318b (see FIG. 17) of the second attachment flange sections 316a, 316b of the belt-fixing section 308b, is rotated in the direction (direction of the arrow M1) in which the curved section 342 is separated from the second frame member 304. That is, the lock plate 306b is substantially perpendicular to the second frame member 304.

Subsequently, the engaging member 322 is installed to the end 32b of the timing belt 32 so that the engaging member 322 is fitted to the parallel teeth 60 of the timing belt 32.

Further, as shown in FIG. 20, the end 32b of the timing belt 32, to which the engaging member 322 is installed, is inserted by a predetermined length toward the first frame member 302 (in the direction of the arrow N1) between the bent section 328 of the lock plate 306b and the second frame member 304.

Lastly, as shown in FIG. 21, the lock plate 306b is rotated in the direction (direction of the arrow M2) in which the curved section 342 approaches the second frame member 304 about the support points of the projections 340a, 340b engaged with the second engaging holes 318a, 318b of the second attachment flange sections 316a, 316b. When the inner wall surface of the bent section 328 abuts against the tapered surface 326 of the engaging member 322, the engaging member 322 is fastened by the lock plate 306b.

When the lock plate 306b is rotated in the direction (direction of the arrow M2) in which the lock plate 306b approaches the second frame member 304, the curved section 342 passes through the space between the second pawls 320a, 320b so that the curved section 342 approaches the second frame member 304. In this procedure, as shown in FIG. 17, the distance L3 between the second pawls 320a, 320b is formed to be slightly narrower than the height K of the lock plate 306b (L3<K). Therefore, the rotary action of the lock plate 306b is stopped by the second pawls 320a, 320b.

Accordingly, the bent section 328 of the lock plate 306b is prevented from rotation in the direction (direction of the arrow M1) to separate from the second frame member 304, while the bent section 328 of the lock plate 306b abuts against the engaging member 322.

As a result, a fastened state is favorably retained, in which the bent section 328 of the lock plate 306b is engaged with the tapered surface 326 of the engaging member 322. Therefore, the timing belt 32 is kept fixed reliably and favorably by the belt-fixing section 308b. The tension of the timing belt 32 is prevented from being loosened.

On the other hand, when the end 32b of the timing belt 32 is pulled in the direction (direction of the arrow N2) to separate from the belt-fixing section 308b, the timing belt 32 is displaced together with the engaging member 322 to be fastened by the abutment of the tapered surface 326 of the step section 324 of the engaging member 322 against the inner wall surface of the bent section 328.

As a result, even when the timing belt 32 is pulled in the axial direction (direction of the arrow N2) by the rotary driving source 26, the timing belt 32 is not disengaged from the belt-fixing section 308b since the engaging member 322 is fastened by the lock plate 306b. The timing belt 32 is reliably fixed to the belt-fixing section 308b.

When the timing belt 32, which is fixed to the belt-fixing sections 308a, 308b as described above, is detached from the belt-adjusting mechanism 300, the ends 32a, 32b of the timing belt 32 are displaced in the directions (directions of the arrow N1) in which the belt-fixing sections 308a, 308b approaches to one another (for example, the tension of the timing belt 32 is loosened).

The engaging members 322 are displaced together with the timing belt 32 to thereby disengage the tapered surfaces 326 of the engaging members 322 from the bent sections 328 of the lock plates 306a, 306b.

Subsequently, as shown in FIG. 20, the lock plates 306a, 306b are rotated in the directions (directions of the arrow M1) in which the curved sections 342 are separated from the first frame member 302 and the second frame member 304 about the support points of the projections 340a, 340b respectively. As a result, the engaging member 322 is released from the bent section 328. When the ends 32a, 32b of the timing belt 32 are pulled in the directions (directions of the arrow N2) to separate from the belt-fixing sections 308a, 308b, the timing belt 32 can be easily disengaged from the belt-fixing sections 308a, 308b (see FIG. 19).

That is, in the belt-adjusting mechanism 300 shown in FIGS. 16 to 24, the lock plates 306a, 306b are rotated about the support points of the projections 340a, 340b which are rotatably supported by the first engaging holes 312a, 312b of the first attachment flange sections 310a, 310b and the second engaging holes 318a, 318b of the second attachment flange sections 316a, 316b. The bent sections 328 of the lock plates 306a, 306b abut against the tapered surfaces 326 of the engaging members 322. By doing so, the timing belt 32 is fastened by the engaging members 322. Therefore, the timing belt 32, which is integrally engaged with the engaging members 322, is restricted in the displacement in the axial direction.

Accordingly, the ends 32a, 32b of the timing belt 32 can be easily and reliably fixed by the belt-adjusting mechanism 300 by using the belt-fixing sections 308a, 308b.

The lock plates 306a, 306b are rotated in the directions (directions of the arrow M2) to approach the first frame member 302 and the second frame member 304, and the lock plates 306a, 306b pass through the space between the first pawls 314a, 314b and through the space between the second pawls 320a, 320b, respectively.

Accordingly, the lock plates 306a, 306b can be prevented from rotation in the directions (directions of the arrow M1) to separate from the first frame member 302 and the second frame member 304 by the first pawls 314a, 314b and the second pawls 320a, 320b. Therefore, a fastened state of the timing belt 32 is favorably retained by the lock plates 306a, 306b. Thus, it is possible to reliably avoid loosening of the tension of the timing belt 32.

The belt-fixing sections 308a, 308b comprise the lock plates 306a, 306b which press and fix the timing belt 32, and the engaging members 322 which are installed to the parallel teeth 60 of the timing belt 32. Accordingly, it is possible to decrease the number of constitutive parts, and it is possible to reduce the cost as compared with a case in which the timing belt 32 is fixed, for example, by a plurality of screw members.

Further, it is unnecessary to perform any complicated operation in which the timing belt 32 is fixed by screwing the plurality of screw members. It is possible to perform the fixing operation of the timing belt more easily and efficiently.

Furthermore, it is possible to reduce the size of the belt-fixing sections 308a, 308b as compared with a case in which the timing belt 32 is fixed by the screw members.

Figure 23:
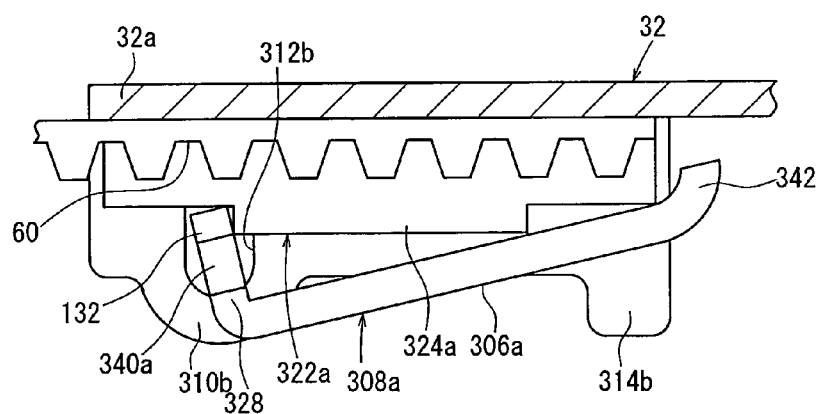
FIG. 23 is a partial magnified view illustrating components in the vicinity of the belt-adjusting mechanism depicting a state in which a bent section of a lock plate presses the other end of an engaging member.

In another embodiment, as shown in FIG. 23, a step section 324a of an engaging member 322a has a substantially perpendicular or orthogonal shape. When the lock plate 306a is rotated, the end of the bent section 328 of the lock plate 306a is engaged with and fastened by the step section 324a. The end of the bent section 328 abuts against another surface of the engaging member 322a. The engaging member 322a is pressed toward the timing belt 32 by the bent section 328.

That is, the end 32a of the timing belt 32 is pressed by the engaging member 322a, and this state is favorably retained by the bent section 328 of the lock plate 306a. Therefore, the timing belt 32 is reliably and favorably kept to be fixed by the belt-fixing section 308a. The tension of the timing belt 32 is prevented from being loosened.

As a result, as shown in FIG. 21, even when the timing belt 32 is pulled in the axial direction (direction of the arrow N2) by the rotary driving source 26, the timing belt 32 is not disengaged from the belt-fixing sections 308a, 308b by the lock plates 306a, 306b. Additionally, the timing belt 32 is more reliably fixed to the belt-fixing sections 308a, 308b under the pressing action of the lock plates 306a, 306b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An electric actuator comprising a driving force-transmitting belt for transmitting rotary driving force of a rotary driving source to a slider, and a tension-adjusting mechanism for adjusting tension of said driving force-transmitting belt, said tension-adjusting mechanism comprising:
   a first member to which one end of said driving force-transmitting belt is connected;
   a second member to which another end of said driving force-transmitting belt is connected and which is provided displaceably in an axial direction with respect to said first member;
   an adjusting member which adjusts a distance between said first member and said second member, wherein said adjusting member comprises an adjusting screw which is screwed with said first member; and
   an elastic member which is provided between said adjusting member and said first member, said elastic member fitted over said adjusting screw and providing a biasing force acting in a direction to urge a head portion of said adjusting screw away from said first member,
   wherein said first member is fixed on said slider, and an axis of said adjusting member is disposed within a cross section of said driving force-transmitting belt perpendicular to said axis.

2. The electric actuator according to claim 1, wherein indication means is provided on said second member for displaying a displacement amount of said adjusting member.

3. The electric actuator according to claim 1, wherein ends of said driving force-transmitting belt are engaged with engaging grooves formed on said first member and said second member corresponding to shapes of parallel teeth of said driving force-transmitting belt, and said ends are interposed between said first member and a first fixing member and between said second member and a second fixing member.

4. The electric actuator according to claim 1, wherein said second member has a pair of two branches near said first member, engaging holes are formed through said two branches, lock screws engage with said engaging holes and are screwed with said first member.

5. The electric actuator according to claim 1, wherein said first member has a pair of two branches near said second member, engaging holes are formed through said second member, lock screws engage with engaging holes and are screwed with said two branches.

6. The electric actuator according to claim 1, wherein a plurality of insertion holes are formed in a circumferential surface of a head of said adjusting screw.

7. The electric actuator according to claim 1, wherein center lines of one end and the other end of said driving force-transmitting belt and said axis of said adjusting member are arranged on a straight line.

8. The electric actuator according to claim 1, wherein said first member has a fastening section, into which said driving force-transmitting belt is inserted, and a thickness of said fastening section is smaller than a thickness of a retaining section formed near said second member adjacently to said fastening section.

9. The electric actuator according to claim 1, wherein a fastening section, into which said driving force-transmitting belt is inserted, is formed on said second member, and a thickness of said fastening section is smaller than a thickness of a retaining section formed near said first member adjacently to said fastening section.

10. The electric actuator according to claim 1, wherein said first member and said second member are formed by pressing.

11. The electric actuator according to claim 1, wherein said one end of said driving force-transmitting belt, when connected to said first member, is immovable with respect to said first member, and said another end of said driving force-transmitting belt, when connected to said second member, is immovable with respect to said second member.

12. An electric actuator comprising a driving force-transmitting belt for transmitting rotary driving force of a rotary driving source to a slider, and a tension-adjusting mechanism for adjusting tension of said driving force-transmitting belt, said tension-adjusting mechanism comprising:
   a first member which is installed to said slider and to which one end of said driving force-transmitting belt is connected;
   a second member to which another end of said driving force-transmitting belt is connected and which is displaceable in an axial direction with respect to said first member;
   lock members which are rotatably supported by said first member and said second member about support points of ends of said lock members; and
   engaging members which are formed with step sections and which are installed to said ends of said driving force-transmitting belt,
   wherein engaging sections of said lock members are engaged with said step sections by rotation of said lock members, and said driving force-transmitting belt is fastened to said first member and said second member by said engaging members.

13. The electric actuator according to claim 12, wherein said engaging sections are formed on said lock members, said engaging sections press said engaging members toward said driving force-transmitting belt by rotation of said lock members, and said driving force-transmitting belt is fixed to said first member and said second member.

14. The electric actuator according to claim 12, wherein a tapered surface is formed on said engaging member, said tapered surface is inclined to be gradually wide in width in a direction from said step section to said driving force-transmitting belt.

15. The electric actuator according to claim 12, wherein first attachment flange sections and second attachment flange sections are formed on said first member and said second member, said lock members are rotatably supported on said first attachment flange sections and said second attachment flange sections, respectively, and a pair of pawls, which are inclined to approach one another in directions from said first attachment flange sections and said second attachment flange sections to a center of each of said first member and said second member, are formed, respectively.

16. The electric actuator according to claim 15, wherein a distance between said pair of pawls is smaller than a width of each of said lock members.

17. The electric actuator according to claim 12, wherein each of said lock members has a curved section which has a substantially circular arc-shaped cross section and which is formed at an end opposite to an end at which said engaging section is formed.

18. The electric actuator according to claim 12, wherein said first member and said second member are formed by pressing.

19. The electric actuator according to claim 12, wherein said one end of said driving force-transmitting belt, when connected to said first member, is immovable with respect to said first member, and said another end of said driving force-transmitting belt, when connected to said second member, is immovable with respect to said second member.

20. An electric actuator comprising a driving force-transmitting belt for transmitting rotary driving force of a rotary driving source to a slider, and a tension-adjusting mechanism for adjusting tension of said driving force-transmitting belt, said tension-adjusting mechanism comprising:
- a first member which is installed to said slider and to which one end of said driving force-transmitting belt is connected;
- a second member to which another end of said driving force-transmitting belt is connected and which is displaceable in an axial direction with respect to said first member;
- an adjusting member which adjusts a distance between said first member and said second member;
- an elastic member which is provided between said adjusting member and said first member;
- lock members which are rotatably supported by said first member and said second member about support points of ends of said lock members; and
- engaging members which are formed with step sections and which are installed to said ends of said driving force-transmitting belt, wherein an axis of said adjusting member is disposed within a cross section of said driving force-transmitting belt perpendicular to said axis, engaging sections of said lock members are engaged with said step sections by rotation of said lock members, and said driving force-transmitting belt is fastened to said first member and said second member by said engaging members.

21. The electric actuator according to claim 20, wherein said engaging sections press said engaging members toward said driving force-transmitting belt by rotation of said lock members, and said driving force-transmitting belt is fixed to said first member and said second member.

22. The electric actuator according to claim 20, wherein said adjusting member comprises an adjusting screw which is screwed with said first member, and a plurality of insertion holes are formed in a circumferential surface of a head of said adjusting screw.

23. The electric actuator according to claim 20, wherein said one end of said driving force-transmitting belt, when connected to said first member, is immovable with respect to said first member, and said another end of said driving force-transmitting belt, when connected to said second member, is immovable with respect to said second member.

* * * * *